(12) United States Patent
Sato et al.

(10) Patent No.: US 8,732,421 B2
(45) Date of Patent: May 20, 2014

(54) STORAGE SYSTEM AND METHOD FOR REALLOCATING DATA

(75) Inventors: Katsuya Sato, Odawara (JP); Shintaro Inoue, Odawara (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 13/256,393

(22) PCT Filed: Aug. 26, 2011

(86) PCT No.: PCT/JP2011/004764
§ 371 (c)(1),
(2), (4) Date: Sep. 13, 2011

(87) PCT Pub. No.: WO2013/030864
PCT Pub. Date: Mar. 7, 2013

(65) Prior Publication Data
US 2013/0054920 A1    Feb. 28, 2013

(51) Int. Cl.
*G06F 12/00* (2006.01)
*G06F 13/00* (2006.01)
*G06F 13/28* (2006.01)

(52) U.S. Cl.
USPC ............................ 711/165; 711/154; 711/170

(58) Field of Classification Search
USPC .......................................... 711/154, 165, 170
See application file for complete search history.

(56) References Cited

U.S. PATENT DOCUMENTS

| | | | |
|---|---|---|---|
| 2003/0140207 A1 | 7/2003 | Nagase et al. | |
| 2005/0125456 A1* | 6/2005 | Hara et al. | 707/200 |
| 2009/0070541 A1 | 3/2009 | Yochai | |
| 2009/0125675 A1* | 5/2009 | Tsuboki et al. | 711/112 |
| 2011/0145525 A1 | 6/2011 | Browne et al. | |
| 2011/0197044 A1* | 8/2011 | Sudo et al. | 711/165 |

OTHER PUBLICATIONS

PCT International Search Report and Written Opinion on application PCT/JP2011/004764 mailed Feb. 3 2012; 11 pages.

* cited by examiner

*Primary Examiner* — Ryan Bertram
(74) *Attorney, Agent, or Firm* — Foley & Lardner LLP

(57) ABSTRACT

The present invention comprises a virtual volume 50, which is a virtual storage area comprising multiple virtual page groups, a pool 60, which is a storage area comprising multiple pool page groups having different access performance, and a controller 13, which comprises a corresponding relationship between the virtual page and the pool page, and accesses the pool page corresponding to the virtual page based on accesses to the virtual page from other apparatuses, and the controller 13, based on an access load trend with respect to each virtual page in each time slot, executes processing for deciding an ideal pool page allocation destination for each virtual page in each time slot, and reallocating a virtual page to the ideal pool page at a time, which is prior to a start time, so that the ideal pool page can be allocated to each virtual page by the start time of each time slot.

8 Claims, 23 Drawing Sheets

207

Reallocation schedule management table

| (Reallocation) Start time – Scheduled end time | Change-source tier – Change-destination tier | List of reallocation targets |
|---|---|---|
| 10:50-11:00 | 0→1 | ... |
| 10:50-11:00 | 0→2 | V01,... |
| 10:50-11:00 | 1→2 | ... |
| 10:50-11:00 | 2→1 | ... |
| 10:55-11:00 | 1→0 | V02,... |
| 10:55-11:00 | 2→0 | ... |
| 11:50-12:00 | 0→1 | V02,... |
| 11:50-12:00 | 0→2 | ... |
| 11:50-12:00 | 1→2 | ... |
| 11:50-12:00 | 2→1 | V20,... |
| 11:55-12:00 | 1→0 | ... |
| 11:55-12:00 | 2→0 | V01,... |
| ... | ... | ... |

FIG. 4

Pool mapping table 201

| Disk volume number | Tier number | Disk type | RAID level | PG number | Disk volume capacity [GB] | Pool number | Number of unused pages |
|---|---|---|---|---|---|---|---|
| DVol5 | 0 | SAS-SSD | 3D1P | 4 | 750 | P1 | 399 |
| DVol5 | 1 | SAS-HDD | 6D2P | 5 | 1200 | P1 | 150 |
| DVol7 | 2 | SATA-HDD | — | 2 | 1000 | P1 | 300 |
| ... | ... | ... | ... | ... | ... | ... | ... |

FIG. 5

Pool page management table 202

| Disk volume number | Pool page number | Pool page utilization status |
|---|---|---|
| DVol5 | P001 | In use |
| DVol5 | P002 | Unused |
| DVol6 | P101 | Unused |
| ... | ... | ... |
| DVol7 | P201 | In use |
| ... | ... | ... |

Virtual page management table

| Virtual volume number | Virtual page number | Preliminary reallocation flag | Disk volume number | Pool page number |
|---|---|---|---|---|
| VVol1 | V01 | ON | DVol5 | P001 |
| VVol1 | V02 | ON | DVol6 | P102 |
| VVol1 | V03 | OFF | N/A | N/A |
| ... | ... | ... | ... | ... |
| VVol1 | V20 | OFF | DVol7 | P202 |
| ... | ... | ... | ... | ... |

Number of virtual page accesses management table (Previous day) 204a

| Virtual volume number | Virtual page number | Number of accesses by time slot | | |
|---|---|---|---|---|
| | | 5/12 9:00-10:00 | 5/12 10:00-11:00 | 5/12 11:00-12:00 |
| VVol1 | V01 | 3000 | 4000 | 500 |
| VVol1 | V02 | 1000 | 1000 | 4500 |
| ... | ... | ... | ... | ... |
| VVol1 | V20 | 200 | 400 | 300 |

(Current day) 204b

| Virtual volume number | Virtual page number | Number of accesses by time slot | | |
|---|---|---|---|---|
| | | 5/13 9:00-10:00 | 5/13 10:00-11:00 | 5/13 11:00-12:00 |
| VVol1 | V01 | 2800 | 4000 | |
| VVol1 | V02 | 1000 | 850 | |
| ... | ... | ... | ... | |
| VVol1 | V20 | 190 | 300 | |

Pool frequency distribution table

| Pool number | 5/12 10:00-11:00 | | |
|---|---|---|---|
| | Interval of number of accesses | Number of virtual pages | List of virtual pages |
| P1 | 4000-4999 | 500 | V01,... |
| P1 | 3000-3999 | 800 | ... |
| P1 | 2000-2999 | 600 | ... |
| P1 | 1000-1999 | 1000 | V02,... |
| P1 | 0-999 | 2000 | V20,... |
| ... | ... | ... | ... |

Ideal tier management table

| Virtual volume number | Virtual page number | Ideal tier number by time slot | | |
|---|---|---|---|---|
| | | 9:00-10:00 | 10:00-11:00 | 11:00-12:00 |
| VVol1 | V01 | 0 | 0 | 2 |
| VVol1 | V02 | 1 | 1 | 0 |
| ... | ... | ... | ... | ... |
| VVol1 | V20 | 2 | 2 | 2 |

Reallocation schedule management table

| (Reallocation) Start time – Scheduled end time | Change-source tier – Change-destination tier | List of reallocation targets |
|---|---|---|
| 10:50-11:00 | 0→1 | ... |
| 10:50-11:00 | 0→2 | V01,... |
| 10:50-11:00 | 1→2 | ... |
| 10:50-11:00 | 2→1 | ... |
| 10:55-11:00 | 1→0 | V02,... |
| 10:55-11:00 | 2→0 | ... |
| 11:50-12:00 | 0→1 | ... |
| 11:50-12:00 | 0→2 | V02,... |
| 11:50-12:00 | 1→2 | ... |
| 11:50-12:00 | 2→1 | V20,... |
| 11:55-12:00 | 1→0 | ... |
| 11:55-12:00 | 2→0 | V01,... |
| ... | ... | ... |

FIG. 18

210   Preliminary reallocation threshold management table

| Pool number | Threshold time (min) |
|---|---|
| PVol5 | 20 |
| PVol6 | 30 |
| ... | ... |

STORAGE SYSTEM AND METHOD FOR REALLOCATING DATA

TECHNICAL FIELD

The present invention relates to the reallocation of data.

BACKGROUND ART

Storage systems, due to the need to handle large volumes of data, have become larger in scale and more complex in recent years. For this reason, there is demand for storage systems that can be managed easily and used efficiently. One prior art that meets this demand is thin provisioning technology. In this technology, the storage system constructs a virtual logical volume (called a "virtual volume" hereinafter) that does not comprise a physical storage area. The storage system then provides the virtual volume to a host computer. The host computer carries out a data write request to a virtual page that makes up this virtual volume. The storage system allocates a pool page from a pool configured from multiple pool pages to the virtual page targeted by the data write request. The pool comprises either one or multiple physical storage areas (referred to as a "disk volume" hereinafter). Each disk volume is partitioned into two or more pool pages. The disk volume comprising the pool may be a substantial logical volume configured based on one or more storage media (for example, a RAID group configured using multiple storage media), or a virtual logical volume to which is associated a logical volume of a storage system external to the storage system.

In accordance with this technology, the storage system-provided volume capacity can be efficiently used, and the volume capacity can be appropriately designed.

The disk volume is generally configured from storage media of the same performance. However, the frequency with which respective virtual pages are accessed is normally not the same, and frequently accessed virtual pages are mixed together with infrequently accessed virtual pages. For this reason, for example, in a case where the disk volume is configured using only a high-performance storage medium, an excess of performance will occur with respect to a virtual page with a low access frequency. By contrast, in a case where a pool is configured using only a low-performance disk volume, a shortage of performance will occur with respect to a virtual page with a high access frequency.

One method for solving this problem is disclosed in Patent Literature 1. According to Patent Literature 1, a single pool is configured using multiple disk volumes having different performance (typically, access performance), and based on the access frequency of each virtual page, a pool page allocated to a virtual page and data stored in this pool page is reallocated to a pool page of a disk volume comprising the ideal performance. The performance of the disk volume depends on the performance (typically, access performance) of the storage medium constituting the basis for this disk volume.

CITATION LIST

Patent Literature

PTL 1: US Patent Application Publication No. 2009/0070541

SUMMARY OF INVENTION

Technical Problem

In Patent Literature 1, the reallocation of the pool page allocated to the virtual page is carried out subsequent to a change having been detected in the access frequency of the virtual page. The reallocation process takes time. Therefore, when a reallocation is executed after detecting a change in the access frequency of the virtual page as in the Cited Literature 1, a situation occurs in which the allocation of the pool page to the virtual page is not optimal.

Accordingly, an object of the present invention is to lower the probability of a situation occurring in which the pool page allocation with respect to the virtual page is not optimal.

Solution to Problem

The storage system comprises a virtual volume, which is a virtual logical volume comprising multiple virtual page groups, a pool, which is a storage area comprising multiple pool page groups having different access performance, and a controller, which comprises a corresponding relationship between the virtual page and the pool page, and accesses the pool page corresponding to the virtual page based on accesses to the virtual page from other apparatuses. The controller, based on an access load (for example, frequency of accesses to the pool page) trend with respect to each virtual page in each time slot, executes processing for deciding an ideal pool page allocation destination for each virtual page in each time slot, and reallocating a virtual page to the ideal pool page at a time prior to a start time of each time slot so that the ideal pool page can be allocated to each virtual page by the start time of each time slot.

In accordance with this, an ideal pool page is allocated to a virtual page in each time slot. Consequently, the virtual volume as a whole is able to demonstrate high performance in all of the time slots.

In the preferred embodiment, when a cumulative access load for a virtual page from a start time of a certain time slot to a current time becomes equal to or larger than a cumulative access load for the virtual page in a certain time slot in the past that includes the current time, the current time is a preliminary reallocation start time, and a time which goes back by a minimum period of time required to complete the reallocation process from the start time of the certain time slot, is the reallocation start time. Then, in a case where the preliminary reallocation start time is earlier than the reallocation start time, the reallocation process starts from the preliminary reallocation start time, and in a case where the preliminary reallocation start time is either identical to or later than the reallocation start time, the reallocation process starts from the reallocation start time. For example, a "certain time slot in the past that includes the current time" may be the same time slot as the time slot comprising "from a start time of a certain time slot to a current time".

This makes it possible to carry out reallocation processing over a longer period of time. Consequently, the access load on the pool page generated at reallocation processing time can be temporally leveled.

Furthermore, the storage system may be a single configuration or may be a multiple configuration.

BRIEF DESCRIPTION OF DRAWINGS

FIG. 4 shows an example of a pool mapping table 201.

FIG. 5 shows an example of a pool page management table 202.

FIG. 7 shows an example of a table 204 for managing the number of virtual page accesses.

FIG. 9 shows an example of an ideal tier management table 206.

FIG. 10 shows an example of a reallocation schedule management table 207.

FIG. 18 shows an example of a preliminary reallocation threshold management table 210.

DESCRIPTION OF EMBODIMENTS

Figure 1:
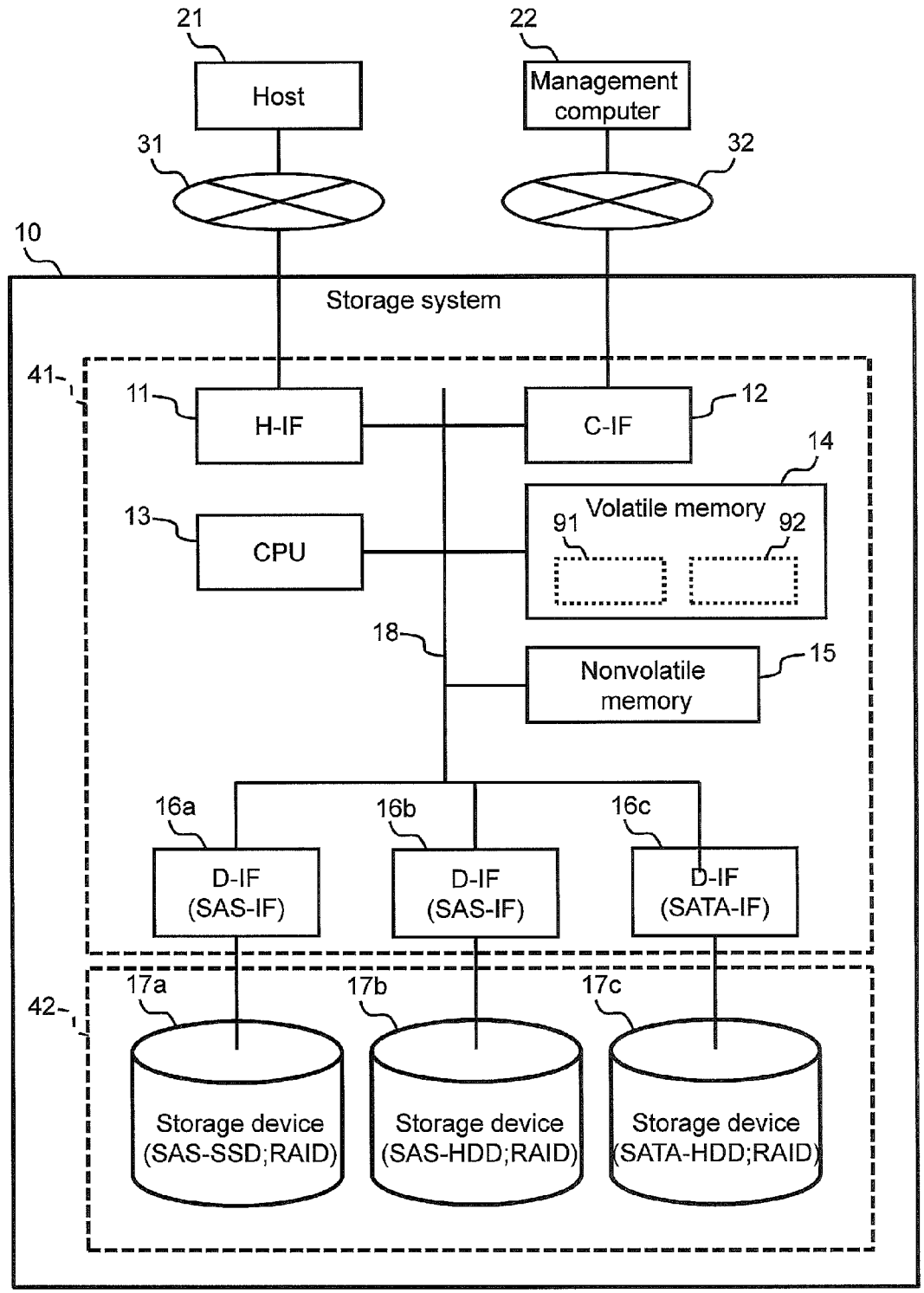
FIG. 1 shows the system configuration of a storage system 10 related to Example 1.

A number of examples of the present invention will be explained below using the drawings. In the drawings referred to below, the same reference signs will be attached to parts that are the same. However, the present invention is not limited to these examples, and all sorts of examples of applications that are consistent with the idea of the present invention are included within the technical scope of the present invention. Furthermore, unless specifically limited, the respective components may be either singular or plural.

Furthermore, in the following explanation, various types of information may be explained using the expression "xxx table", but the various information may also be expressed using a data structure other than a table. To show that the various information is not dependent on the data structure, "xxx table" can be called "xxx information".

Furthermore, in the following explanation, a number is used as identification information for identifying an element, but another type of identification information (for example, alphanumeric characters) may be used either instead of or in addition to a number as the identification information.

Also, in the following explanation, there may be cases where processing is explained having a "program" as the doer of the action, but since the stipulated processing is performed in accordance with a program being executed by a processor (for example, a CPU (Central Processing Unit)) while using a storage resource (for example, a memory) and/or a communication interface device (for example, a communication port) as needed, the processor may also be used as the doer of the processing. A process, which is explained using the program as the doer of the action, may be regarded as a process performed by an apparatus comprising this processor (for example, a storage apparatus or a control apparatus). Furthermore, the processor may comprise a hardware circuit that carries out either part or all of the processing either instead of or in addition to a microprocessor like the CPU. A computer program may be installed in respective apparatuses from a program source. The program source, for example, may be either a program delivery server or a computer readable storage medium.

Example 1

FIG. 1 shows the system configuration of a storage system 10 related to Example 1.

For example, either one or multiple host computers 21 are coupled to the storage system 10 via a first communication network 31. Furthermore, for example, either one or multiple management computers 22 are coupled to the storage system 10 via a second communication network 32.

The hardware configuration of the host computer 21 is the same as that of an ordinary computer. That is, the host computer 21 comprises a communication interface (referred to as "IF" hereinafter), a volatile memory, an nonvolatile memory, and a CPU, which is coupled to these components. The communication IF, for example, is a fibre channel IF for carrying out communications via the first communication network 31. The host computer 21 reads data from the storage system 10 and writes data to the storage system 10 via the first communication network 31.

The hardware configuration of the management computer 22 is the same as that of an ordinary computer. That is, the management computer 22 comprises a communication IF, a volatile memory, an nonvolatile memory, and a CPU, which is coupled to these components. The communication IF, for example, is a NIC for carrying out communications via the second communication network 32. The management computer 22 controls the storage system 10 from a remote location via the second communication network 32.

The first communication network 31 and the second communication network 32 are communication lines, which couple the host computer 21 to the storage system 10, and the management computer 22 to the storage system 10, respectively. Data signals are transmitted over the communication networks 31 and 32. The communication networks 31 and 32, for example, are configured as fixed lines, such as either metal cables or optical fibre cables. However, the communication networks 31 and 32 may be wireless. In this case, the communication lines would be omitted. Furthermore, the communication networks 31 and 32 may be a shared communication network. The communication networks 31 and 32, for example, are either a SAN (Storage Area Network) or a LAN (Local Area Network).

The storage system 10 can be broadly divided into a control apparatus 41 and a disk unit 42.

The disk unit 42 comprises multiple storage devices 17. The disk unit 42 may comprise physically different types of storage devices 17. The disk unit 42 in this example comprises at least a SSD (Solid State Disk), a SAS (Serial Attached SCSI)-HDD (Hard Disk Drive), and a SATA (Serial Advanced Technology Attachment)-HDD. However, the storage device 17 may be another type of physical storage device 17 either instead of or in addition to at least one of these types.

The disk unit 42 is coupled to the control apparatus 41 via a communication line such as a fibre channel cable. Furthermore, multiple storage devices 17 can configure either one or multiple RAID (Redundant Arrays of Inexpensive Disks) groups. In this example, the SSD, SAS-HDD and the SATA-HDD each configure a RAID group.

Next, the configuration of the control apparatus 41 will be explained.

The control apparatus 41 controls a data write/read to/from the disk unit 42 in accordance with a command received from the host computer 21. The control apparatus 41 provides a virtual volume 50, which conforms to thin provisioning. The virtual volume 50 comprises multiple virtual pages 51. The virtual page 51 is a virtual logical area, and, for example, is expressed as a LBA (Logical Block Address). The virtual volume 50 will be explained in detail further below.

The control apparatus 41 comprises a communication interface, a storage resource, and a processor coupled thereto. As the communication interface, for example, there is a host communication interface (referred to as a "H-IF" hereinafter) 11, a management computer communication interface (referred to as a "C-IF" hereinafter) 12, and a disk interface (referred to as a "D-IF" hereinafter) 16. As the storage resource, for example, there is a volatile memory 14 and a nonvolatile memory 15. The processor, for example, is a CPU 13 (Central Processing Unit). These devices are coupled to one another via a bus 18 or other such communication line.

The volatile memory 14, for example, is used as a main memory 91 and a cache memory 92 when a computer program (referred to as a "program" hereinafter) is executed.

The nonvolatile memory 15 stores a program and a data table (referred to as a "table" hereinafter). Each program is transferred from the nonvolatile memory 15 to the main memory 91 of the volatile memory 14 and executed by the CPU 13. Specific programs and tables will be explained further below. Furthermore, a table, which is alright to delete when the power to the storage system 10 is shut off, may be stored in the volatile memory 14.

Each program stored in the nonvolatile memory 15 is read to the main memory 91 as needed. Various processes, which will be described further below, are carried out in accordance with the CPU 13 executing the respective programs read to the main memory 91.

Data received from the host computer 21 and data read from the storage device 17 are temporarily stored in the cache memory 92.

The H-IF 11 is coupled to the host computer 21 via the first communication network 31. An access command (either a write command or a read command) sent from the host computer 21 is received in the H-IF 11. The H-IF 11, for example, is a fibre channel IF.

The C-IF 12 is coupled to the management computer 22 via the second communication network 32. The C-IF 12, for example, is a NIC (Network Interface Card).

The D-IF 16 carries out the sending and receiving of data between the control apparatus 41 and the respective storage devices 17. The D-IF 16, for example, is either the IF of a SAS (referred to as a "SAS-IF" hereinafter) or the IF of a SATA (referred to as a "SATA-IF" hereinafter).

Figure 2:
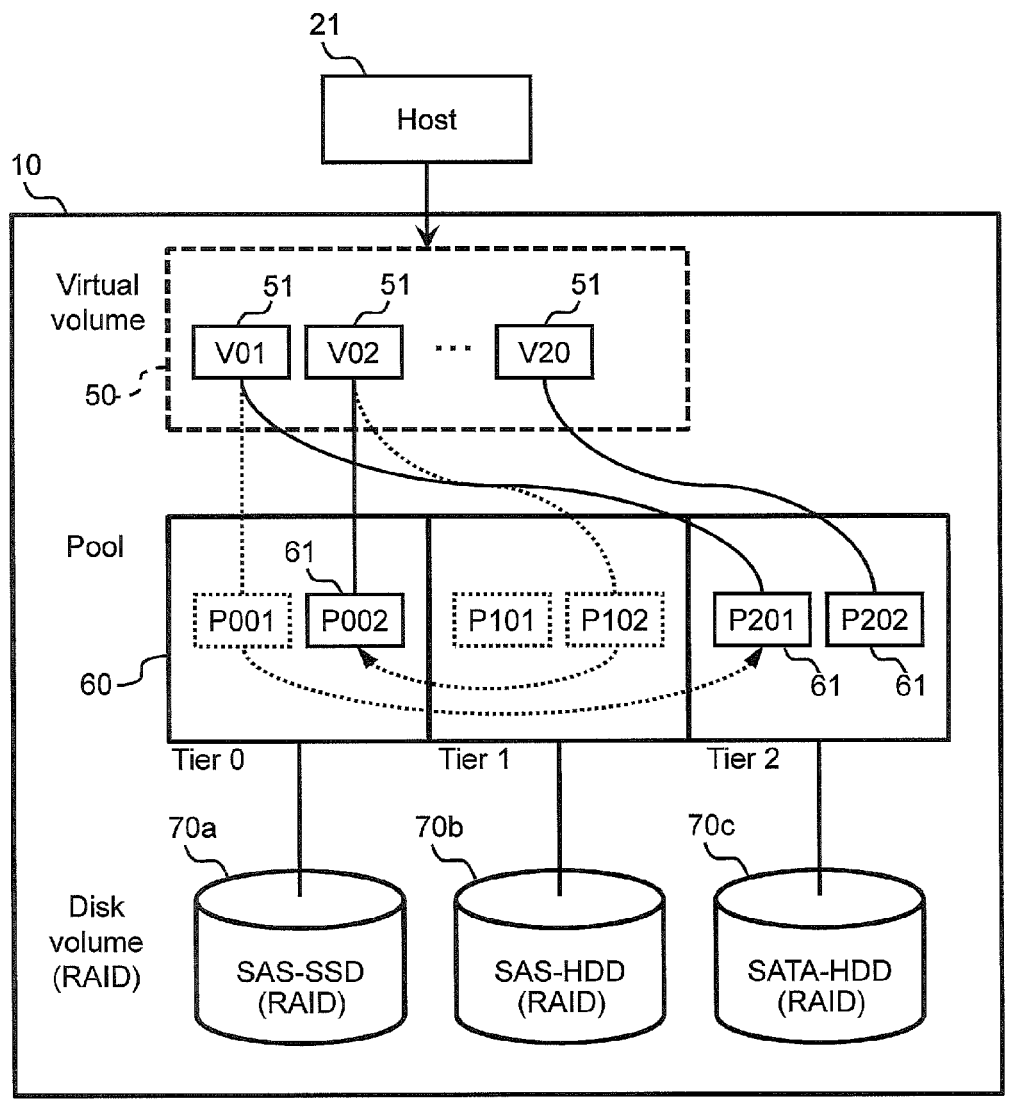
FIG. 2 shows an illustration of a virtual volume 50 maintained by the storage system 10.

FIG. 2 shows an illustration of the virtual volume 50 maintained by the storage system 10.

The storage system 10 comprises multiple storage devices 17 of different types (for example, access performance). These storage devices 17 are recognized by the storage system 10 as a disk volume 70. The disk volume 70 may be a logical volume configured from a single storage device 17, or may be a logical volume configured from multiple storage devices 17. An identification number of a tier to which a volume 70 attached to this tier belongs, called a tier number, is assigned to each disk volume 70. In this example, it is supposed that the smaller the tier number, the higher the performance of the disk volume 70. High performance, for example, refers to the high speed writing and reading of data.

The storage system 10 comprises a pool 60 configured from multiple disk volumes 70. An identification number (referred to as a "pool number" hereinafter) is assigned to the pool 60. Each disk volume 70 comprising a pool 60 is partitioned in two or more pool pages 61. Each pool page 61 is area of a prescribed data size. An identification number (referred to as a "pool page number" hereinafter) is assigned to a pool page 61. The pool page 61 stores the tier number of the disk volume 70 to which it itself belongs. This will be referred to as "the pool page 61 belongs to tier XX (where XX is the tier number)". That is, the pool 60 comprises multiple tiers having different access performance, and the tier is configured using one or more disk volumes 70 having the same access performance. Furthermore, the storage system 10 may comprise multiple pools 60. A prescribed actual area of the disk volume 70 is allocated to the pool page 61.

Furthermore, at least one disk volume 70 that makes up a pool 60 may be a virtual logical volume to which a logical volume is mapped based on a storage device inside a storage apparatus that exists outside of the storage system 10 (an external storage apparatus). In the case of an access to a pool page 61 inside this virtual logical volume, the access is carried out to a logical volume inside the external storage apparatus corresponding to this virtual logical volume.

The storage system 10 comprises a virtual volume 50, which is associated with the pool 60. Multiple virtual volumes 50 may be associated with a single pool 60. An identification number (referred to as a "virtual volume number" hereinafter) is assigned to the virtual volume 50. The virtual volume 50 is configured from multiple virtual pages 51, which are virtual storage areas of a prescribed data size. An identification number (referred to as a "virtual page number" hereinafter) is assigned to the virtual page 51. The number of the tier to which the pool page 61 allocated to the virtual page 51 belongs can be interpreted as the number of the tier to which this virtual page 51 belongs. This will be referred to as "the virtual page 51 belongs to tier XX (where XX is the tier number)". A pool page 61 is first allocated when the virtual page 51 is used (for example, when data is written to the virtual page 51). That is, a pool page 61 is not necessarily allocated to a virtual page 51 that is not being used.

The storage system 10 manages the pool page 61 allocated to the virtual page 51 based on the virtual page management table 203. Data written to a prescribed virtual page 51 of the virtual volume 50 from the host computer 21 is written to the pool page 61 allocated to this virtual page 51. The virtual page management table 203 will be explained in detail further below.

The storage system 10 changes the pool page 61 allocated to the virtual page 51 as needed to optimize the performance of the virtual volume 50. This change process will be referred to as a "reallocation process". For example, the storage system 10 allocates a pool page 61 belonging to a high performance disk volume 70 to a virtual page 51 that has a high access load, and allocates a pool page 61 belonging to a relatively low performance disk volume 70 to a virtual page 51 that has a low access load. This process can also be referred to as "changing the tier to which a virtual page 51 belongs in accordance with the access load of the virtual page 51". Furthermore, in the reallocation process, a data migration between pages is carried out. For example, the control apparatus 41 migrates data from pool page X to pool page Y in a case where the pool page 61 allocated to the virtual page A is to change from pool page X to pool page Y.

A specific example will be described below using FIG. 2. Furthermore, in this example, it is supposed that the access load is the cumulative number of accesses during a prescribed period of time (a so-called access frequency). However, the access load is not limited to the number of accesses, and may be another type of access load, for example, either the cumulative amount of I/O data or the cumulative I/O processing time.

For example, in a case where either the access frequency of a virtual page 51 "V01" is low or is expected to become low, the tier to which the virtual page 51 "V01" belongs changes from a high-performance tier 0 to a relatively low-performance tier 2. That is, the pool page 61 allocated to the virtual page 51 "V01" is changed from the pool page 61 "P001", which belongs to tier 0, to pool page 61 "P201", which belongs to tier 2. The data stored in the pool page 61 "P001" is migrated to the pool page 61 "P201" at this time.

For example, in a case where either the access frequency of the virtual page 51 "V02" is high or is expected to become high, the tier to which the virtual page 51 "V02" belongs changes from a relatively low-performance tier 1 to the high-performance tier 0. That is, the pool page 61 allocated to the virtual page 51 "V02" is changed from the pool page 61 "P102", which belongs to tier 1, to pool page 61 "P002", which belongs to tier 0. The data stored in the pool page 61 "P102" is migrated to the pool page 61 "P002" at this time.

Thus, the storage system 10 can provide a high-performance virtual volume 50 to the host computer 21 by reallocating a pool page 61 that is allocated to a virtual page 51 based on the host computer 21 access trend.

Next, the apparatuses, programs, and tables comprising the storage system 10 will be explained in detail.

Figure 3:
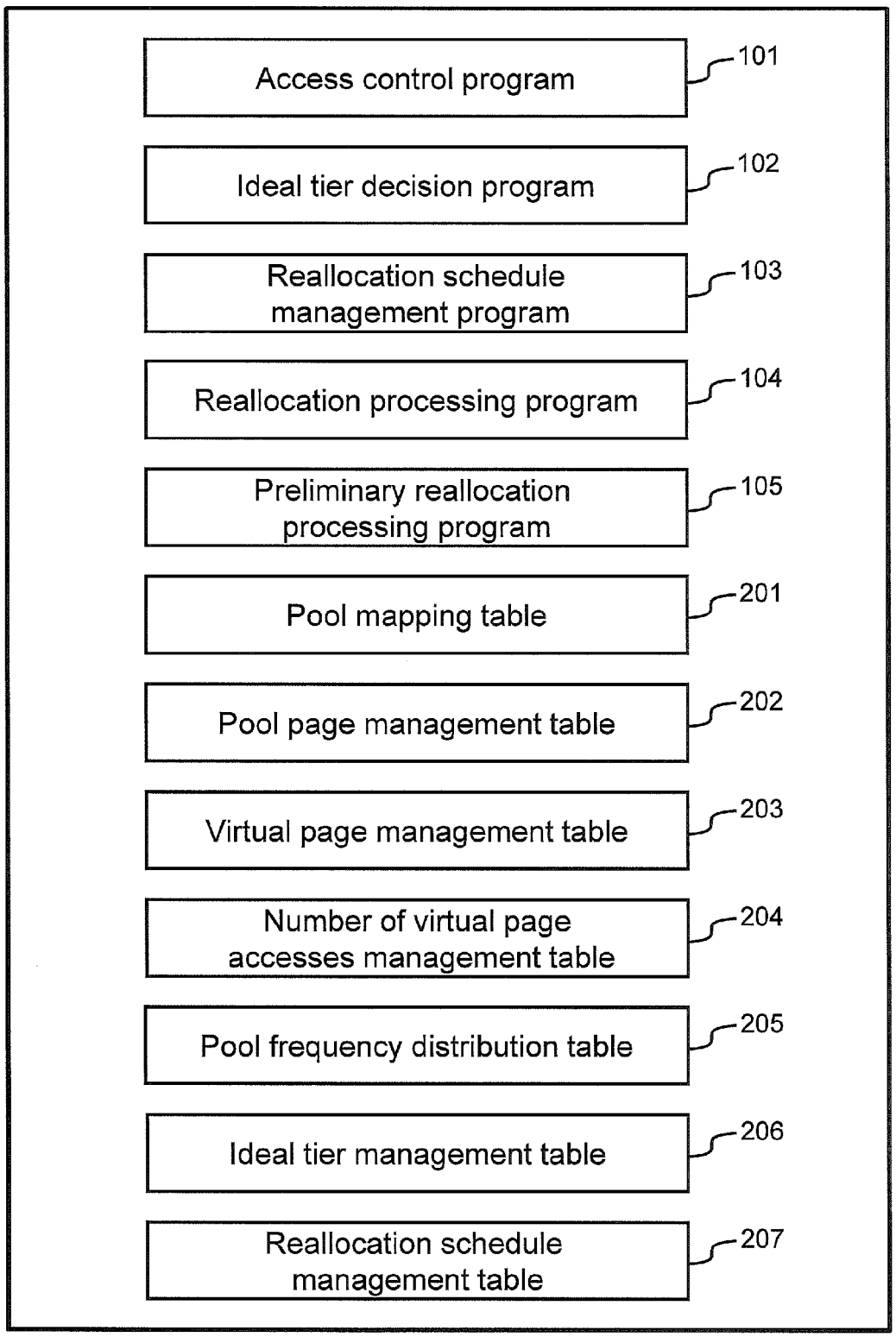
FIG. 3 shows an example of the programs and tables stored in a nonvolatile memory 15.

FIG. 3 shows an example of the programs and tables stored in the nonvolatile memory 15.

For example, the nonvolatile memory 15 stores an access control program 101, an ideal tier decision program 102, a reallocation schedule management program 103, a reallocation processing program 104, a preliminary reallocation processing program 105, a pool mapping table 201, a pool page management table 202, a virtual page management table 203, a management table for number of virtual page accesses 204, a pool frequency distribution table 205, an ideal tier management table 206, and a reallocation schedule management table 207.

The access control program 101 receives a command from the host computer 21, and carries out processing in accordance with this command. The commands, for example, include a write command requesting a data write, a read command requesting a data read, and a delete command requesting the deletion of data to/from a prescribed virtual page 51 of the virtual volume 50. Furthermore, the access control program 101 returns a response as to the success or failure of the processing with respect to the command received from the host computer 21.

The ideal tier decision program 102 decides the number of an ideal tier for each virtual page 51 (referred to as an "ideal tier number" hereinafter) in a prescribed time slot, and records the result thereof in the ideal tier management table 206. In a case where the virtual pages 51 configuring the virtual volume 50 all belong to ideal tiers in a certain time slot, the performance of this virtual volume 50 will be the best related to this time slot. The ideal tier for a virtual page 51 will differ for different time slots. The ideal tier number decision method, for example, refers to the pool frequency distribution table 205, and makes a virtual page 51 with a high access frequency belong to a tier that has a small number (that is, a high-performance tier), and makes a virtual page 51 with a low access frequency belong to a tier that has a large number (that is, a relatively not high-performance tier). The processing of the ideal tier decision program 102 will be explained in detail further below.

The reallocation schedule management program 103 computes the time required for a reallocation based on the ideal tier management table 206, the performance of each disk volume 70, and the number of pool pages 61 to be reallocated. Then, based on the computed time required for reallocation, the reallocation schedule management program 103 decides a start time and a scheduled end time of the reallocation, and records these times in the reallocation schedule management table 207 together with the number of the virtual page being targeted for reallocation.

The reallocation processing program 104 refers to the reallocation schedule management table 207, and carries out a reallocation process for the virtual page 51 targeted for reallocation. "Reallocation process" in this example may be the changing of the tier number assigned to the virtual page 51 to a different tier number. In other words, the data of the pool page 61 referred to in the virtual page 51 may be migrated to another pool page 61, and the pool page 61 allocated to the virtual page 51 may be changed to the migration-destination pool page 61.

The preliminary reallocation processing program 105 carries out a reallocation process for a virtual page 51 ahead of the reallocation start time in the reallocation schedule management table 207 based on a condition other than the reallocation schedule management table 207. The other condition, for example, may be a case in which a prescribed number of accesses has been reached within a prescribed time period for a certain virtual page 51. This makes it possible to carry out a reallocation process for a longer period of time than a reallocation process carried out based on the reallocation schedule management table 207. Therefore, it is possible to level the access load on a storage device 17 generated at reallocation processing time. The processing of the preliminary reallocation processing program 105 will be explained in detail further below.

The pool mapping table 201 stores the corresponding relationship between a pool 60 and a disk volume 70. The pool mapping table 201 will be explained in detail further below.

The pool page management table 202 stores the utilization status of each pool page 61. The pool page management table 202 will be explained in detail further below.

The virtual page management table 203 stores the allocation relationship between a virtual page 51 and a pool page 61. Furthermore, the virtual page management table 203 stores a preliminary reallocation flag with respect to each virtual page 51 denoting whether or not a preliminary reallocation process should be carried out. The virtual page management table 203 will be explained in detail further below.

The management table for number of virtual page accesses 204 stores the number of write and read accesses for each virtual page 51 in a prescribed time slot (that is, the access frequency). Referring to the management table for number of virtual page accesses 204 shows how many accesses were made to a certain virtual page 51 in a certain past time slot. As used here, number of accesses is the number of input and output (the so-called I/O) processes generated with respect to a virtual page 51. The management table for number of virtual page accesses 204 will be explained in detail further below.

The pool frequency distribution table 205 stores the frequency distribution of the number of accesses to a pool page 61 in a prescribed time slot for each pool. This frequency distribution is computed based on the number of accesses to a virtual page 51. The pool frequency distribution table 205 will be explained in detail further below.

The ideal tier management table 206 shows the ideal tier number of each virtual page 51 in a prescribed time slot. The ideal tier management table 206 is created using the ideal tier decision program 102. The ideal tier management table 206 will be explained in detail further below.

The reallocation schedule management table 207 shows the start time and the scheduled end time of a reallocation process for each virtual page 51, a post-change tier number, and a list of virtual pages targeted for reallocation. The reallocation schedule management table 207 is created using the reallocation schedule management program 103. The reallocation schedule management table 207 will be explained in detail further below.

FIG. 4 shows an example of the pool mapping table 201.

The pool mapping table 201 shows the corresponding relationship between the pool 60 and the disk volume 70. The pool mapping table 201 comprises information, such as the tier to which a disk volume 70 belongs. The pool mapping table 201, for example, comprises the following information. One row of the table 201 corresponds to one disk volume 70.

Disk volume number: The identification number of the disk volume.
Tier number: A number for identifying the performance of a disk volume.
Disk type: Information on the type of disk in the disk volume. For example, information as to whether the disk is a SSD coupled to the IF of an SAS, a HDD coupled to the IF of a SAS, or a HDD coupled to the IF of a SATA.
RAID level: The RAID type in a case where the disk volume is configured in accordance with RAID.
PG number: The number of the RAID group (also called a parity group).
Disk volume capacity: The capacity of the disk volume.
Pool number: Pool number of pool to which same-row disk volume belongs.
Number of unused pages: The number of pool pages 61 that are not being used (allocatable pool pages 61, which have not been allocated to any virtual page 51).

FIG. 5 shows an example of the pool page management table 202.

The pool page management table 202 shows the utilization status of each pool page. The pool page management table 202, for example, comprises the following information. One row of the table 202 corresponds to one pool page 61.

Disk volume number: The identification number of a disk volume.
Pool page number: The identification number of a pool page.
Pool page utilization status: Information showing whether the pool page is in an in-use state or an unused state.

According to this table 202, for example, it is clear that the pool page utilization status of the pool page 61 "P002" in the disk volume 60 "DVol5" is "unused". That is, it is clear that the pool page 61 "P002" has not been allocated to any virtual page 51. The information of the pool page management table 202 is updated either when the pool page 61 has been allocated to a virtual 51, or when the allocation of the pool page 61 to a virtual page 51 is cancelled.

Figure 6:
FIG. 6 shows an example of a virtual page management table 203.

FIG. 6 shows an example of the virtual page management table 203.

The virtual page management table 203 shows the corresponding relationship between a virtual page 51 and a pool page 61. Furthermore, the virtual page management table 203 comprises information as to whether or not a preliminary reallocation should be carried out for a virtual page 51. The virtual page management table 203, for example, comprises the following information. One row of the table 203 corresponds to one virtual page 51.

Virtual volume number: The identification number of a virtual volume.
Virtual page number: The identification number of a virtual page.
Preliminary reallocation flag: A flag denoting whether or not the virtual page should undergo a preliminary reallocation process. A virtual page 51 for which the flag is "ON" undergoes a preliminary reallocation process.
Disk volume number: The identification number of a disk volume.
Pool page number: The identification number of a pool page.

According to this table 203, for example, it is clear that the pool page 61 "P001" of the disk volume 70 "DVol5" is allocated to the virtual page 51 "V01" of the virtual volume 50 "VVol1". It is also clear that this virtual page 51 "V01" is targeted for preliminary reallocation. Furthermore, it is clear that a pool page 61 has yet to be allocated to the virtual page 51 "V03" of the virtual volume 50 "VVol1" ("N/A" is the abbreviation for Not Allocated). The virtual page management table 203 is updated either when the allocation relationship between a virtual page 51 and a pool page 61 has changed, or when the preliminary reallocation flag has changed.

FIG. 7 shows an example of the management table for number of virtual page accesses 204.

The management table for number of virtual page accesses 204 shows the history of the number of accesses with respect to each virtual page 51 in each time slot for each date. The management table for number of virtual page accesses 204, for example, comprises the following information. One row of the table 204 corresponds to one virtual page 51.

Virtual volume number: The identification number of a virtual volume.
Virtual page number: The identification number of a virtual page.
Number of accesses by time slot: The number of accesses in each time slot for each date.

According to this table 204a, for example, it is clear that there were "4000" accesses to the virtual page 51 "V01" belonging to the virtual volume 50 "VVol1" between 10:00 and 11:00 on May 12 (previous day). Furthermore, according to the table 204b, assuming that the current date/time is 10:40 on May 13 (today), it is clear that there have been "4000" accesses to the same virtual page 51 "V01" between 10:00 and the current time (10:40) today. The management table for number of virtual page accesses 204 is updated when an access is generated to the virtual page 51.

Figure 8:
FIG. 8 shows an example of a pool frequency distribution table 205.

FIG. 8 shows an example of the pool frequency distribution table 205.

The pool frequency distribution table 205 expresses a frequency distribution, which treats a number of accesses as an interval, for an entire pool 60 based on the number of accesses to each virtual page 51 in a prescribed time slot. The pool frequency distribution table 205, for example, comprises the following information. On row of the table 205 corresponds to one frequency distribution interval.

Pool number: The identification number of a pool.
Number of accesses interval: The frequency distribution intervals based on number of accesses.
Number of virtual pages: The number of virtual pages 51 belonging to a number of accesses interval.

List of virtual pages: A list of the virtual page numbers belonging to a number of accesses interval.

According to this table 205, for example, it is clear that "500" virtual pages belong to the number of accesses interval 4000 through 4999 in the pool 60 "P1" between 10:00 and 11:00 on May 12, and that one of the virtual pages thereamong is "V01".

The number of accesses interval may be arbitrarily configured by the user, or, for example, may be automatically configured based on statistics of the performance of the disk volume 70, the total number of virtual pages 51, and the number of accesses to a virtual page 51 in the past.

FIG. 9 shows an example of the ideal tier management table 206.

The ideal tier management table 206 shows the ideal tier number of each virtual page 51 in a prescribed time slot. The information of the ideal tier management table 206 is registered and upgraded in accordance with the ideal tier decision program 102. The ideal tier management table 206, for example, comprises the following information. One row of the table 206 corresponds to one virtual page 51.

Virtual volume number: The identification number of a virtual volume.

Virtual page number: The identification number of a virtual page.

Ideal tier number: The number of the ideal tier to which the virtual page belongs in each time slot.

According to this table 206, for example, it is clear that the virtual page 51 "V01" of the virtual volume 50 "VVol1" ideally belongs to "tier 0" between 10:00 and 11:00, and to "tier 2" between 11:00 and 12:00. The reason why the ideal tier number differs according to the time slot like this, for example, is because the access frequency with respect to each virtual page 51 can fluctuate greatly for each time slot as a result of regular batch processing. That is, making each virtual page 51 belong to a high-performance tier in a time slot when access frequency is high, and making each virtual page 51 belong to a relatively low-performance tier in a time slot when the access frequency is low makes it possible for the virtual volume 50 as a whole to demonstrate high performance in all the time slots.

FIG. 10 shows an example of the reallocation schedule management table 207.

The reallocation schedule management table 207 shows the start time and the scheduled end time of a reallocation process for each virtual page 51. The information of the reallocation schedule management table 207 is registered and updated in accordance with the reallocation schedule management program 103. The reallocation schedule management table 207, for example, comprises the following information. One row of the table 207 corresponds to one tier change in one time slot.

Start time-Scheduled end time: The time at which a reallocation process starts, and the time at which the reallocation process is scheduled to end. However, a reallocation process does not always end, nor does it have to end at the schedule end time.

Change-source tier→Change-destination tier: The tier number of a change source and the tier number of a change destination.

List of reallocation targets: A list of identification numbers of virtual pages 51 targeted for reallocation processing.

According to this table 207, for example, it is clear that the virtual page 51 "V01" is one of the virtual pages 51 to be reallocated from "tier 0" to "tier 2" beginning at 10:50. Therefore, the virtual page 51 "V01" is reallocated from "tier 0" to "tier 2" when it becomes 10:50.

Next, the preliminary reallocation process will be explained.

Figure 11:
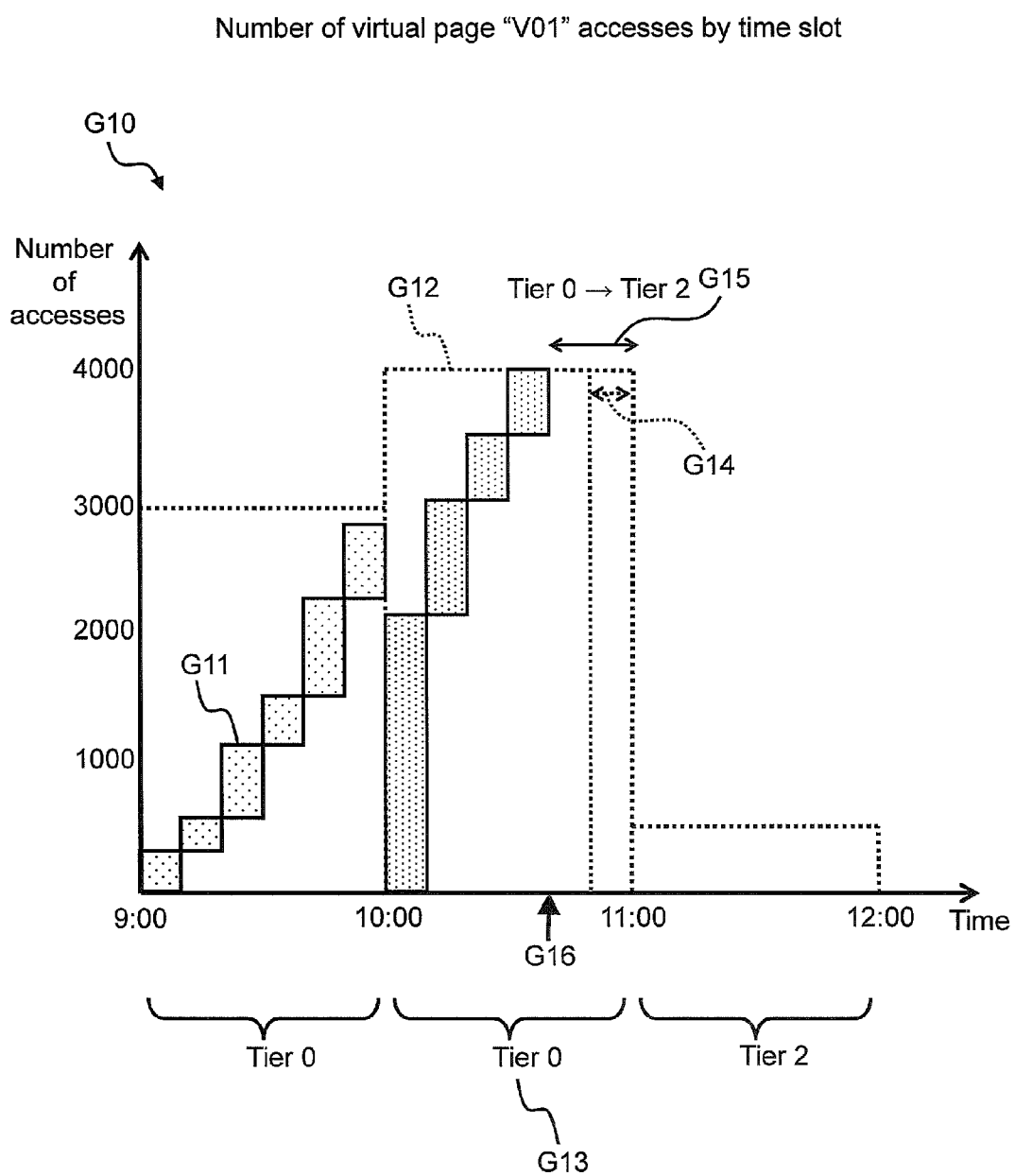
FIG. 11 shows an example of a chart of a number of accesses by time slot for virtual page 51 "V01".

FIG. 11 shows an example of a graph of the number of accesses by time slot with respect to the virtual page 51 "V01".

In the graph G10 of FIG. 11, the vertical axis is the number of accesses of the virtual page 51 "V01", and the horizontal axis is the time. The upper end of a bar graph shows the cumulative total of number of accesses from the start time in a certain time slot. For example, the upper end G11 of the bar graph shows the cumulative number of accesses from 9:00 to 9:30 in the 9:00 to 10:00 time slot.

The number of accesses is reset when the time slot shifts (that is, when the time has moved to the next time slot (for example 10:00 to 11:00)), and is counted anew from the start time of the post-shift time slot (for example, 10:00).

The dotted line G12 shows the maximum number of accesses for each time slot for the previous day (the day before). For example, according to this graph G10, the maximum number of accesses in the 9:00 to 10:00 time slot of the previous day was "3000", and the maximum number of accesses in the 10:00 to 11:00 time slot of the previous day was "4000".

The ideal tier number G13 shows the ideal tier number in each time slot for the virtual page 51 "V01". For example, according to this graph G10, "tier 0" is the ideal tier number from 10:00 to 11:00, and "tier 2" is the ideal tier number from 11:00 to 12:00.

According to the reallocation schedule management table 207 of FIG. 10, the virtual page 51 "V01" will be reallocated from "tier 0" to "tier 2" at 10:50. This is because, according to the ideal tier management table 206 of FIG. 9, the ideal tier number from 11:00 to 12:00 for the virtual page 51 "V01" is "tier 2", and as such, the virtual page 51 "V01" must be reallocated in this time slot. Therefore, it is preferable that the reallocation be completed during the 10 minute period (G14) from 10:50 to 11:00.

However, as shown in the reallocation schedule management table 207 of FIG. 10 not only the virtual page 51 "V01" but also a large number of other virtual pages 51 are to be reallocated beginning at 10:50. Consequently, the access load peak with respect to the disk volume 70 will be high during the 10 minute period (G14) from 10:50 to 11:00. Since the maximum value of the access load of the disk volume 70 is generally set, accesses of equal to or larger than the maximum value will not be able to be processed right away, and processing will be delayed until there is leeway in the access load. Therefore, in a case where there is an access request from the host computer 21 during this 10 minute period, there is a high likelihood that the processing of this access will be delayed. That is, there is the danger that the access performance of the virtual volume 50 will drop sharply during this 10 minute period. In addition, in a case where the reallocation of the virtual pages 51 is not complete by 11:00, there is the danger that access performance will be lower at and after 11:00.

Accordingly, in this example, a drop in the access performance of the virtual volume 50 can be prevented by chronologically dispersing the reallocation processing of the virtual pages 51 to level the access load. This processing will be explained in detail below.

Under the circumstances depicted in the graph G10 of FIG. 11, the preliminary reallocation processing program 105 will preliminarily start the reallocation processing for the virtual page 51 "V01" in a case where the number of accesses from the start time (10:00) to the current time G16 (10:40) in the relevant time slot (10:00 to 11:00) for the virtual page 51

"V01" has reached the number of accesses (4000) of the same time slot the previous day. This makes it possible to carry out the reallocation over a longer period of time (G15) than the reallocation time period (G14) based on the reallocation schedule management table 207. Consequently, the access load of the virtual volume 50 can be leveled.

The above determination is based on an empirical prediction that the cumulative number of accesses with respect to each virtual page 51 in each time slot will not normally change very much on a day-to-day basis. That is, in a case where the cumulative number of accesses from the start time to the current time of the relevant time slot has reached the cumulative number of accesses in the same time slot of the previous day, it is foreseeable that there is little likelihood that an appreciably larger amount of accesses than that will be generated. Consequently, there is little likelihood of a drop in virtual volume 50 performance being incurred even when a high-access-load reallocation process is executed later in time slot. Furthermore, this determination is not limited to a case in which a comparison is made to the cumulative number of accesses of the same time slot the previous day, and, for example, a statistically computed value, such as the average value of the cumulative number of accesses in the same time slot up to the previous day may also be compared. In other words, the preliminary reallocation processing program 105 predicts the number of accesses from the current time onward based on the history of the number of accesses in the past, and preliminarily starts the reallocation process in a case where the number of accesses from the current time onward is expected to be small.

Next, the flow of processing related to the preliminary reallocation process will be explained.

Figure 12:
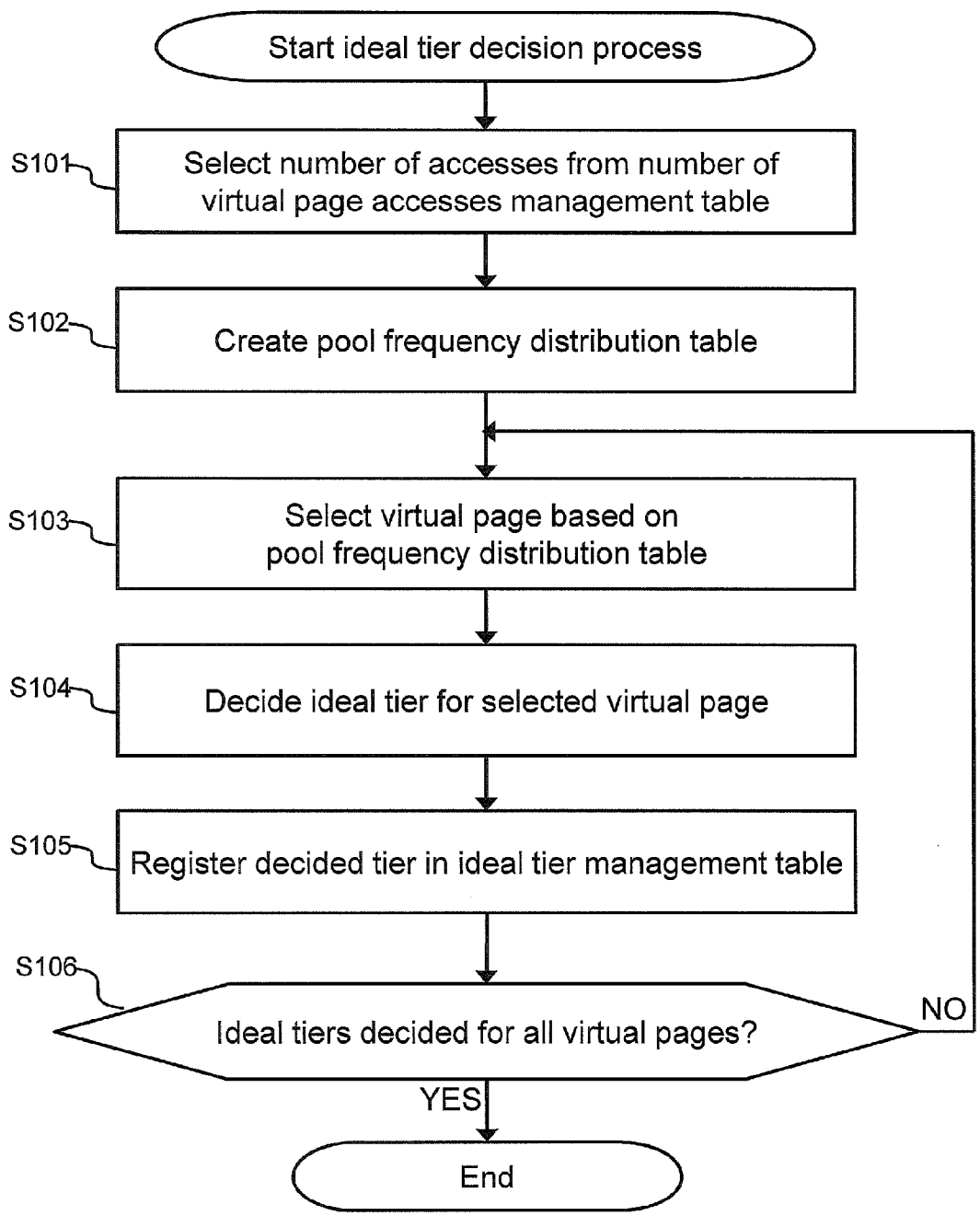
FIG. 12 shows an example of the flow of an ideal tier decision process.

FIG. 12 shows an example of the flow of the ideal tier decision process.

The ideal tier decision program 102 selects the number of accesses in a prescribed time slot of the past for each virtual page 51 from the management table for number of virtual page accesses 204 (S101).

The ideal tier decision program 102, based on the number of accesses of the selected virtual pages 51, computes a frequency distribution by treating the number of accesses as intervals based on the number of accesses in a prescribed time slot of the virtual pages 51 belonging to the same pool 60, and creates a pool frequency distribution table 205 (S102).

The ideal tier decision program 102 selects a virtual page based on the pool frequency distribution table 205 (S103). Specifically, the ideal tier decision program 102 selects a virtual page 51, which belongs to the highest frequency distribution (that is, the virtual page 51 with the largest number of accesses) from among the virtual pages 51 for which an ideal tier has yet to be decided.

The ideal tier decision program 102 decided the ideal tier for the selected virtual page 51. It is supposed that the ideal tier is the highest level tier capable of satisfying the drive performance from among the tiers that still have room for allocation (S104). The drive performance, for example, can be expressed using the following two formulas (1) and (2).

(Formula 1)

Drive performance=performance per unit of capacity of drive×disk volume capacity×60%  (1)

(Formula 2)

Performance per unit of capacity of drive=marginal performance of drive/drive capacity  (2)

The ideal tier decision program 102 registers the virtual page 51 and the ideal tier number thereof in the ideal tier management table 206 (S105).

The ideal tier decision program 102 determines whether or not an ideal tier has been decided for all of the virtual pages 51 (S106).

In a case where ideal tiers have been decided for all the virtual pages 51 (S106: YES), the ideal tier decision program 102 ends this processing.

In a case where there is a virtual page 51 for which an ideal tier has yet to be decided (S106: NO), the ideal tier decision program 102 returns to Step S103 and selects the next virtual page 51.

The ideal tier management table 206 is created in accordance with the above processing.

Figure 13:
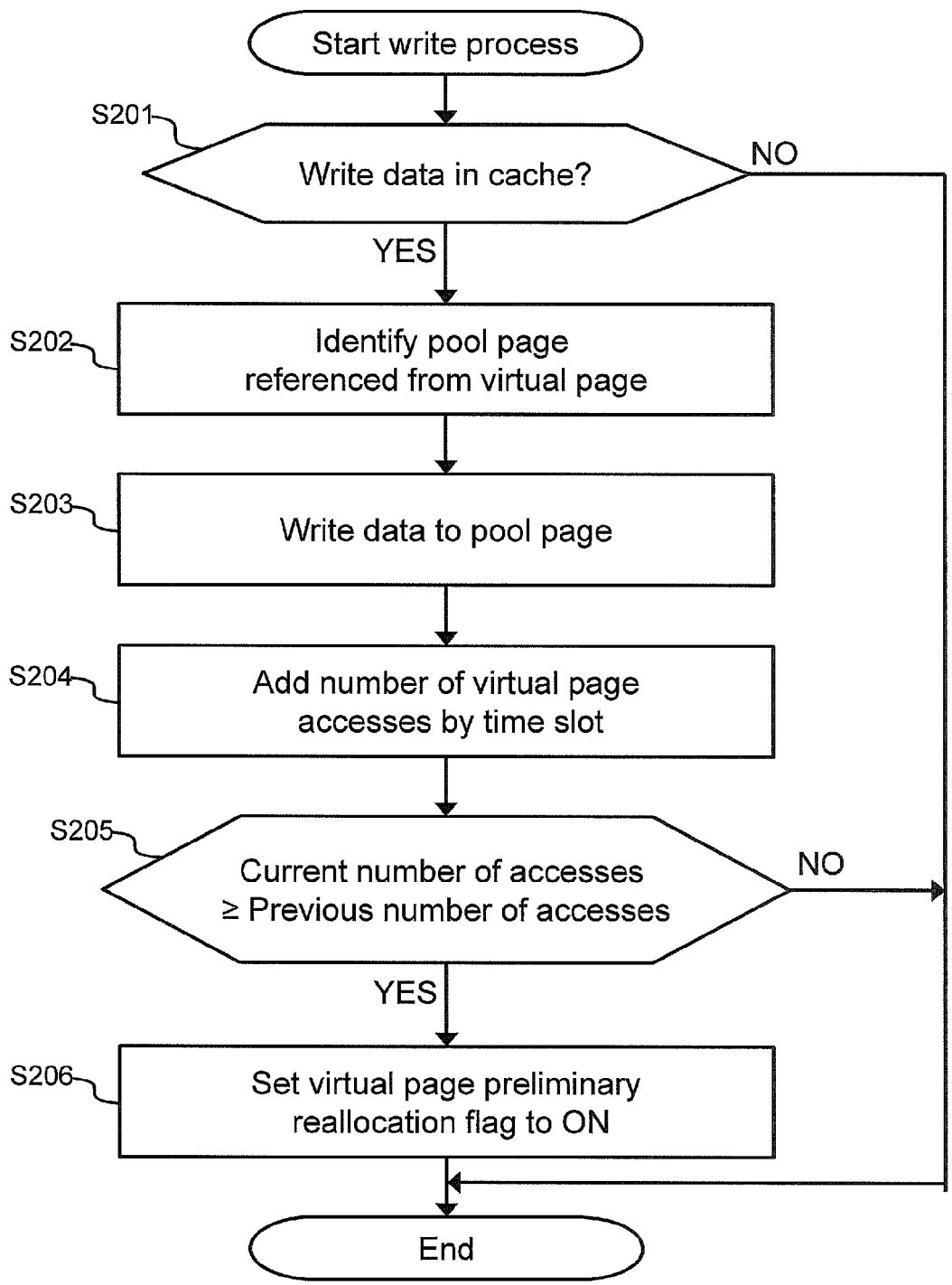
FIG. 13 shows an example of the flow of a write process.

FIG. 13 shows an example of the flow of a write process.

The access control program 101 determines whether or not there is data in the cache memory 92 that should be written to a virtual page 51 (S201). Furthermore, in a case where a data write command has been received from the host computer 21, the access control program 101 may write this data to the cache memory 92 one time and return a write-complete response to the host computer 21 at this point in time. That is, the processing for returning a write-complete response to the host computer 21, and the processing for writing the data to the virtual page 51 may be carried out asynchronously.

In a case where the data to be written to the virtual page 51 is not in the cache memory 92 (S201: NO), the access control program 101 ends this processing as-is.

In a case where data to be written to the virtual page 51 exists in the cache memory 92 (S201: YES), the access control program 101 identifies the write-destination virtual page 51 specified by this data, and identifies the pool page 61 that is allocated to the relevant virtual page 51 (S202). Furthermore, in a case where a pool page 61 has not been allocated, the access control program 101 allocates a new pool page 61.

The access control program 101 writes the data to the identified pool page 61 (S203). That is, the data is written to a prescribed actual area of the disk volume 70 corresponding to this pool page 61.

Since an access is generated to the virtual page 51 at this time, the access control program 101 increases the cumulative number of accesses at the current date/time of the relevant virtual page 51 in the management table for number of virtual page accesses 204 (S204).

The access control program 101 compares the cumulative number of accesses by time slot of the relevant virtual page 51 up to the current date/time (That is, the cumulative number of accesses from the start time to the current time of the time slot comprising the current time. This will be referred to as the "current number of accesses" hereinafter.) to the cumulative number of accesses by time slot of the relevant virtual page 51 at the same time slot of the previous day (That is, the cumulative number of accesses from the start time to the end time of the previous day time slot comprising the current time. This will be referred to as the "number of accesses the previous day" hereinbelow.) in the management table for number of virtual page accesses 204. Then, the access control program 101 determines whether or not the current number of accesses is equal to or larger than the number of accesses the previous day (S205).

In a case where the current number of accesses is smaller than the number of accesses of the previous day (S205: NO), the access control program 101 ends the processing as-is.

In a case where the current number of accesses is equal to or larger than the number of accesses of the previous day (S205: YES), the access control program 101 turns the preliminary reallocation flag of the relevant virtual page 51 to "ON" in the virtual page management table 203, and ends the processing.

Furthermore, this processing is executed any time data to be written to the virtual page 51 exists in the cache memory 92.

A virtual page 51 that should undergo a preliminary reallocation process is decided in accordance with the above processing.

Figure 14:
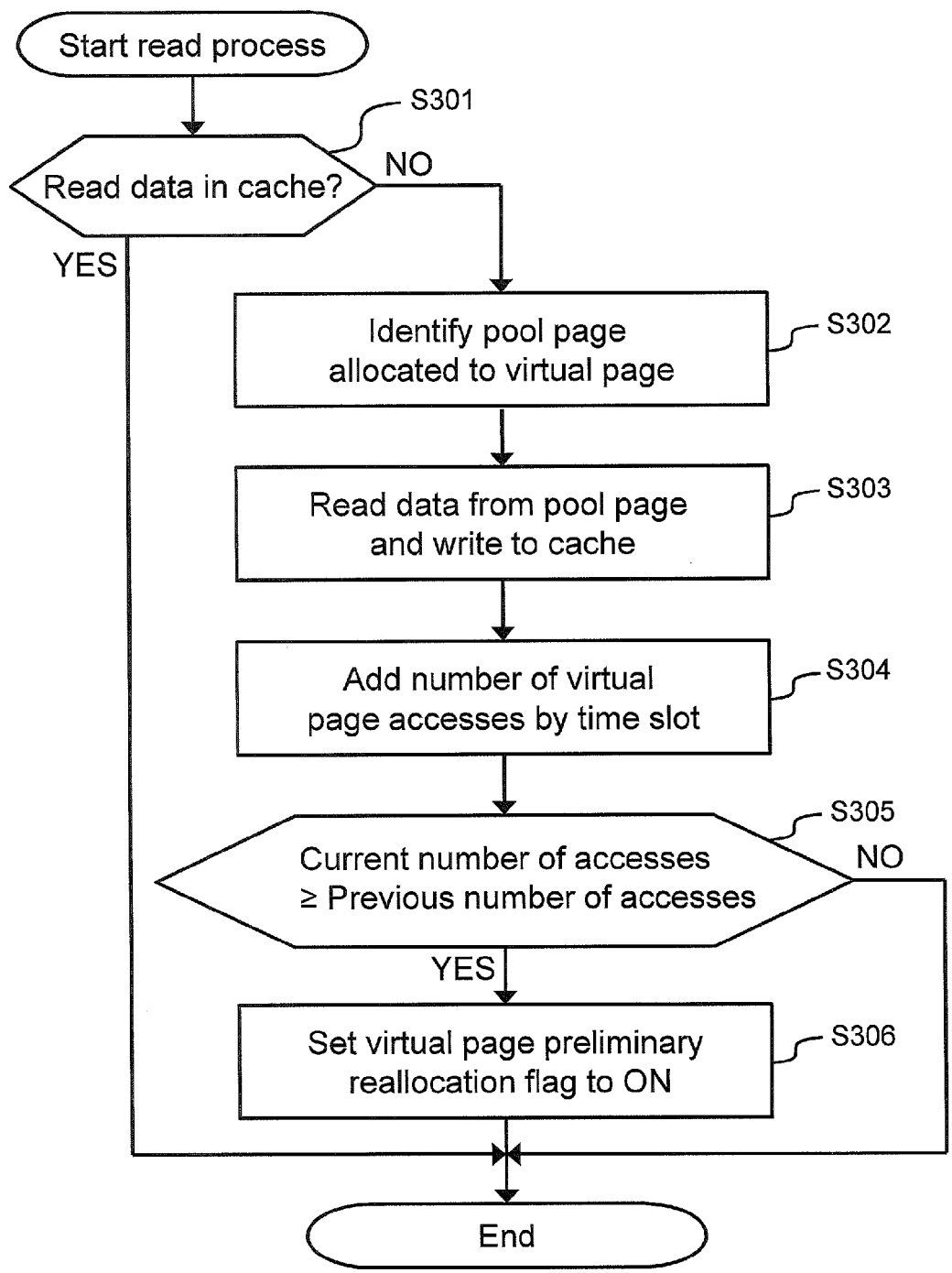
FIG. 14 shows an example of the flow of a read process.

FIG. 14 shows an example of the flow of a read process.

The access control program 101, upon receiving a data read instruction for a prescribed virtual page 51 from the host computer 21, determines whether or not the corresponding data exists in the cache memory 92 (S301).

In a case where the corresponding data exists in the cache memory 92 (S301: YES), the access control program 101 returns the corresponding data to the host computer 21 and ends the processing.

In a case where the corresponding data does not exist in the cache memory 92 (S301: NO), the access control program 101 identifies the virtual page 51 specified by the host computer 21 and identifies the pool page 61 that is allocated to the relevant virtual page 51 (S302).

The access control program 101 reads the data from the identified pool page 61, and writes this data to the cache memory 92 (S303). That is, the access control program 101 read the data from a prescribed storage area of the disk volume 70, which is allocated to this pool page 61, and writes this data to the cache memory 92.

Since an access is generated to the virtual page 51 at this time, the access control program 101 increases the number of accesses at the current date/time of the relevant virtual page 51 in the management table for number of virtual page accesses 204 (S304).

The access control program 101 compares the current number of accesses to the number of accesses of the previous day of the relevant virtual page 51 in the management table for number of virtual page accesses 204. Then, the access control program 101 determines whether or not the current number of accesses is equal to or larger than the number of accesses of the previous day (S305).

In a case where the current number of accesses is smaller than the number of accesses of the previous day (S305: NO), the access control program 101 ends the processing as-is.

In a case where the current number of accesses is equal to or larger than the number of accesses of the previous day (S305: YES), the access control program 101 turns the preliminary reallocation flag of the relevant virtual page 51 to "ON" in the virtual page management table 203, and ends the processing.

A virtual page that should undergo a preliminary reallocation is decided in accordance with this processing.

Figure 15:
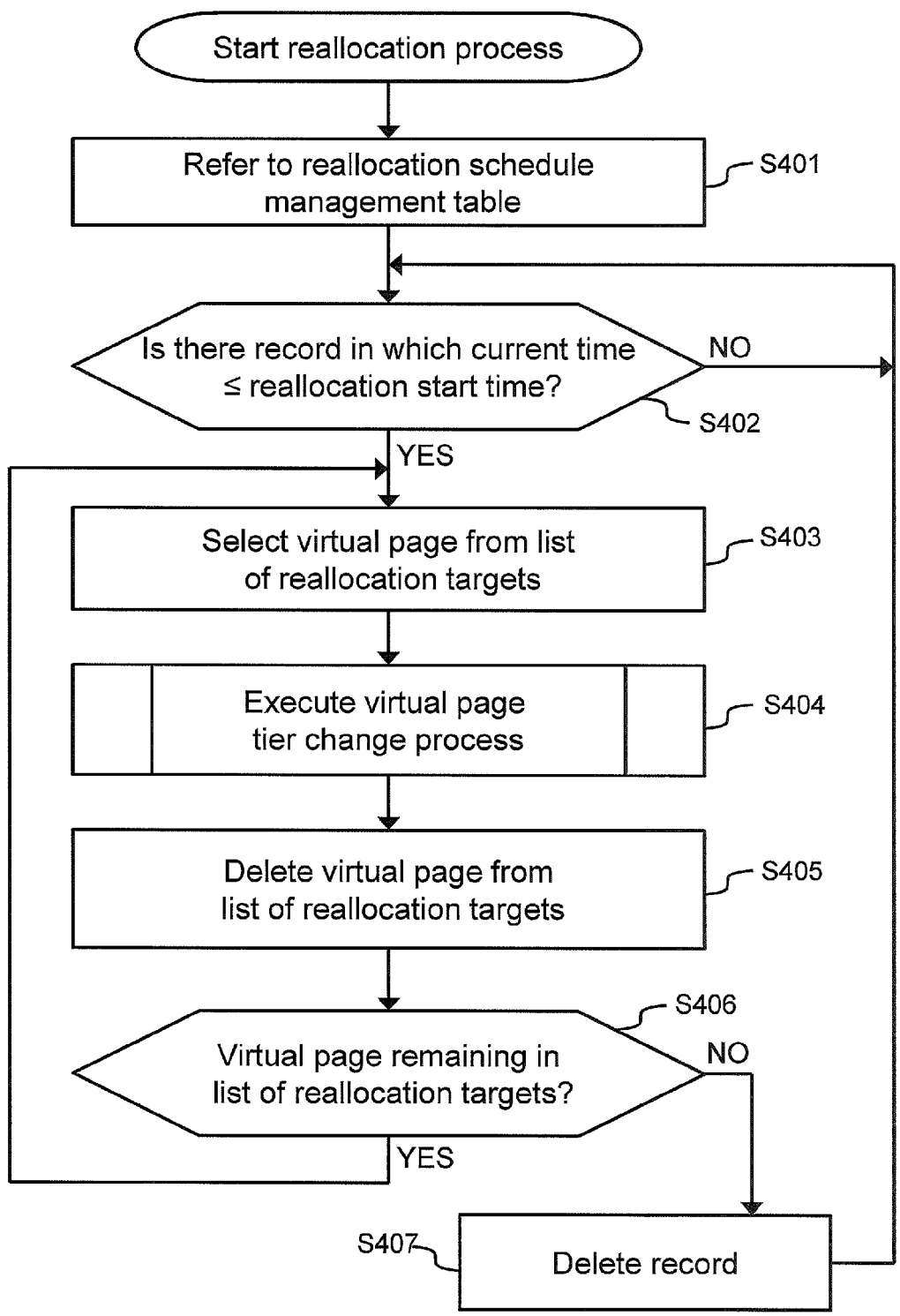
FIG. 15 shows an example of the flow of a reallocation process.

FIG. 15 shows an example of the flow of the reallocation process.

The reallocation processing program 104 refers to the reallocation start time-scheduled end time of the reallocation schedule management table 207 (S401), and determines whether or not there is a record in which either the current time is the same time as the reallocation start time or the start time has expired (S402).

In a case where there is no record in which either the current time is the same time as the start time or the start time has expired (S402: NO), the reallocation processing program 104 returns to Step S402, and waits (or loops) until a time when the relevant record does exist.

In a case where there is a record in which either the current time is the same time as the start time or the start time has expired (S402: YES), the reallocation processing program 104 selects one virtual page 51 from the list of reallocation targets of the relevant record (S403).

The reallocation processing program 104 executes a tier change process with respect to the selected virtual page 51 (S404). The tier change process will be explained further below.

The reallocation processing program 104 deletes the relevant virtual page 51 for which the tier change process was completed from the list of reallocation targets (S405).

The reallocation processing program 104 determines whether or not there is a virtual page 51 for which the tier change process still needs to be carried out remaining in the list of reallocation targets (S406).

In a case where there is a virtual page 51 for which the tier change process should be carried out remaining in the list of reallocation targets (S406: YES), the reallocation processing program 104 returns to Step S403 and selects the next virtual page 51 from the list of reallocation targets.

In a case where there is no virtual page for which the tier change process should be carried out remaining in the list of reallocation targets (S406: NO), the reallocation processing program 104 determines that all of the tier change processing has been completed for the relevant record, deletes the relevant record (S407), and returns to Step S402.

According to the above processing, the tier of a virtual page 51 is changed in conformance with the reallocation schedule management table 207. That is, the pool page 61 that is allocated to the virtual page 51 is reallocated so as to become optimal in the next time slot.

Figure 16:
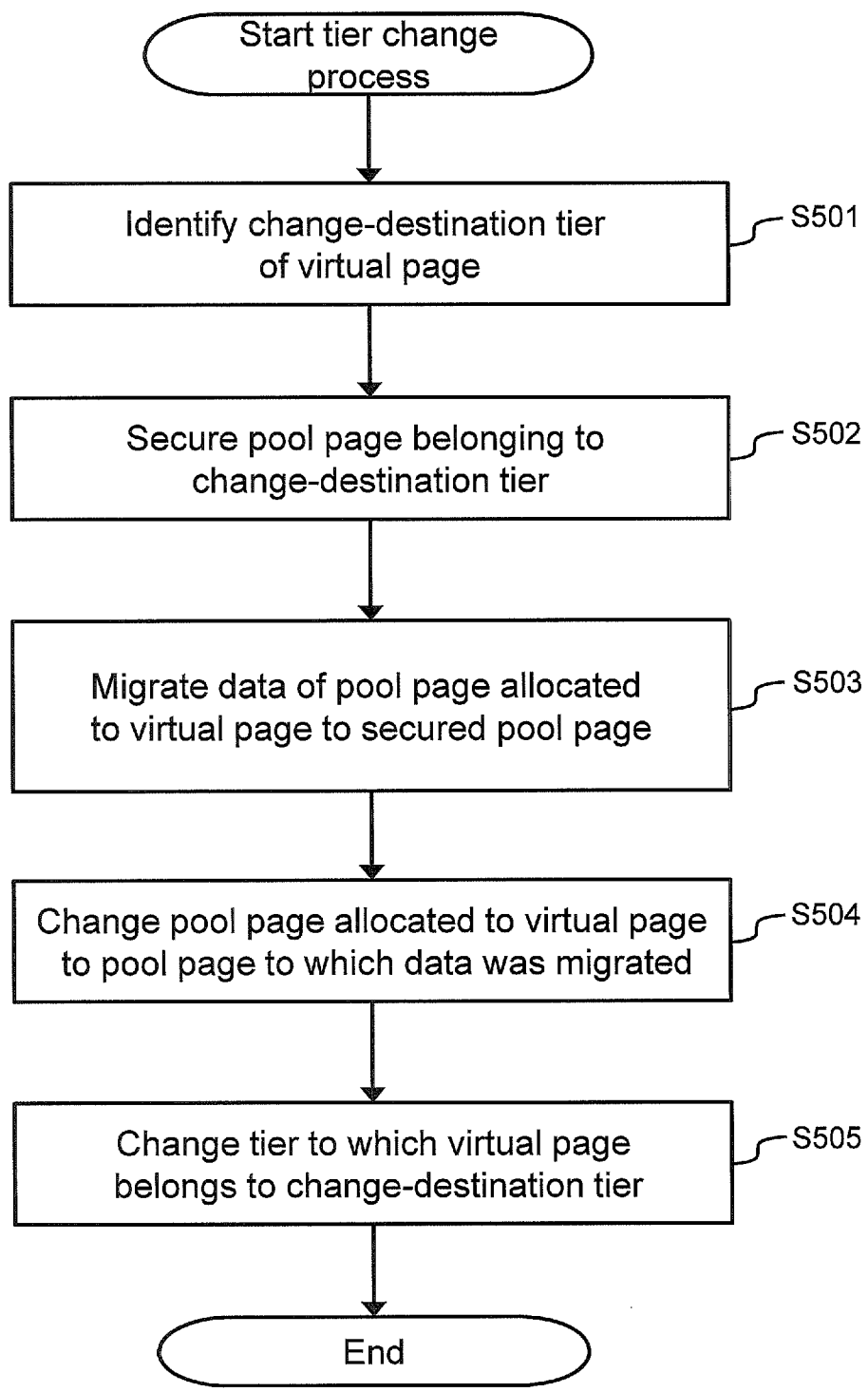
FIG. 16 shows an example of the flow of a tier change process.

FIG. 16 shows an example of the flow of the tier change process.

The reallocation processing program 104 refers to the change-source tier→change-destination tier of the relevant record of the reallocation schedule management table 207, and identifies the change-destination tier of the tier change-target virtual page 51 (S501).

The reallocation processing program 104 reserves a data-writable pool page 61 in the area corresponding to the change-destination tier of the pool 60 (S502). That is, the reallocation processing program 104 reserves a pool page 61 that is not allocated to any virtual page 51.

The reallocation processing program 104 migrates the data of the pool page 61 allocated to the relevant virtual page 51 to the above-mentioned reserved pool page 61 (S503).

The reallocation processing program 104 changes the pool page 61 allocated to the relevant virtual page 51 to the pool page 61, which is the migration destination of the above-mentioned data (S504).

The reallocation processing program 104 changes the tier to which the relevant virtual page 51 belongs from the change-source tier to the change-destination tier (S505).

The tier of the virtual page 51 is change in accordance with the above processing. That is, the pool page 61 allocated to the virtual page 51 is changed.

Figure 17:
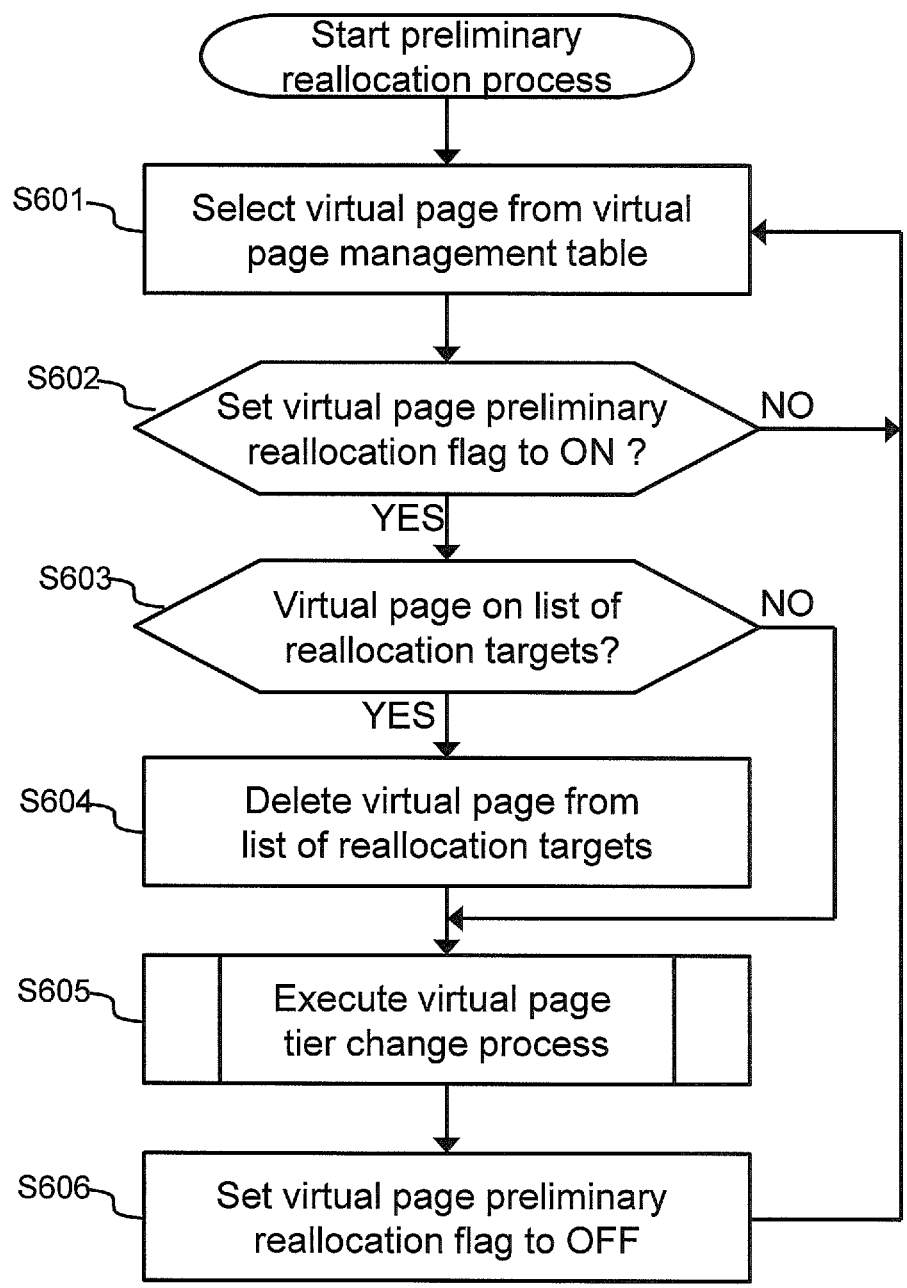
FIG. 17 shows an example of the flow of a preliminary reallocation process.

FIG. 17 shows an example of the flow of the preliminary reallocation process.

The preliminary reallocation processing program 105 selects one virtual page 51 from the virtual page management table 203 (S601).

The preliminary reallocation processing program 105 determines whether or not the preliminary reallocation flag is "ON" for the relevant virtual page 51 that was selected (S602).

In a case where the preliminary reallocation flag is not "ON" for the relevant virtual page 51 (S602: NO), the preliminary reallocation processing program 105 returns to Step S601 and selects one other virtual page 51 from the virtual page management table 203.

In a case where the preliminary reallocation flag is "ON" for the relevant virtual page 51 (S602: YES), the preliminary reallocation processing program 105 determines whether or not the relevant virtual page 51 is on the list of reallocation targets for the time slot of the current time in the reallocation schedule management table 207 (S603). Then, in a case where the relevant virtual page 51 does not exist on the list of reallocation targets (S603: NO), the preliminary reallocation processing program 105 moves to Step S605 as-is.

In a case where the relevant virtual page 51 does exist on the list of reallocation targets (S603: YES), the preliminary reallocation processing program 105 deletes the relevant virtual page 51 from the list of reallocation targets (S604) and proceeds to Step S605.

The preliminary reallocation processing program 105 executes a tier change process for the relevant virtual page 51 (S605). The tier change process is the same as was described hereinabove.

The preliminary reallocation processing program 105 turns "OFF" the preliminary reallocation flag of the relevant virtual page 51 in the virtual page management table 203 (S606), returns to Step S601, and selects one other virtual page 51 from the virtual page management table 203.

According to the above processing, a reallocation is started for a virtual page 51 for which the preliminary reallocation flag is "ON" at a time earlier than the reallocation start time specified in the reallocation schedule management table 207. Therefore, since it is possible to carry out the reallocation process over a longer period of time, leveling can be applied to the peak access load of the disk volume 70, which occurs as a result of the reallocation process.

Example 2

In Example 2, when the current number of accesses to a virtual page 51 reaches the number of accesses of the previous day in a shorter time than a prescribed threshold, instead of changing the relevant virtual page 51 to an ideal tier right away, the relevant virtual page 51 is changed to the ideal tier in stages after first being changed to a tier in between the current tier and the ideal tier (referred to as the "intermediate tier" hereinafter). This is because it can be assumed the number of accesses of the previous day was reached in a shorter time than the prescribed threshold because the access trend differs from that of the previous day, raising the fear that changing the tier suddenly (that is, suddenly changing the access performance) will cause access performance to drop thereafter. Furthermore, in this example, an explanation will be given of an example in which a change is made from a high-performance tier to a relatively low-performance tier, but the applicable scope of the present invention is not limited thereto. For example, the present invention is also applicable to a case in which a change is made from a relatively low-performance tier to a high-performance tier. Furthermore, the intermediate tier is not limited to a single stage, but rather may be a number of stages. The processing of Example 2 will be explained in specific terms hereinbelow. In so doing, the focus of the explanation will be on the points of difference with Example 1, and explanations of the points in common with Example 1 will either be simplified or omitted (The same will hold true for Example 3.).

FIG. 18 shows an example of a preliminary reallocation threshold management table 210.

The preliminary reallocation threshold management table 210 denotes a threshold time for determining whether or not to change tiers in stages for each pool 60. That is, when the current number of accesses reaches the number of accesses of the previous day in a shorter time than this threshold time, the tier is changed in stages. The preliminary reallocation threshold management table 210, for example, comprises the following information.

Pool number: The identification number of a pool.
Threshold time: A time that serves as a threshold for determining whether or not to change tiers in stages.

According to this table 210, for example, it is clear that the threshold time for the pool 60 "P1" is "20 minutes". The method for making a determination in accordance with the threshold time will be explained further below.

Figure 19:
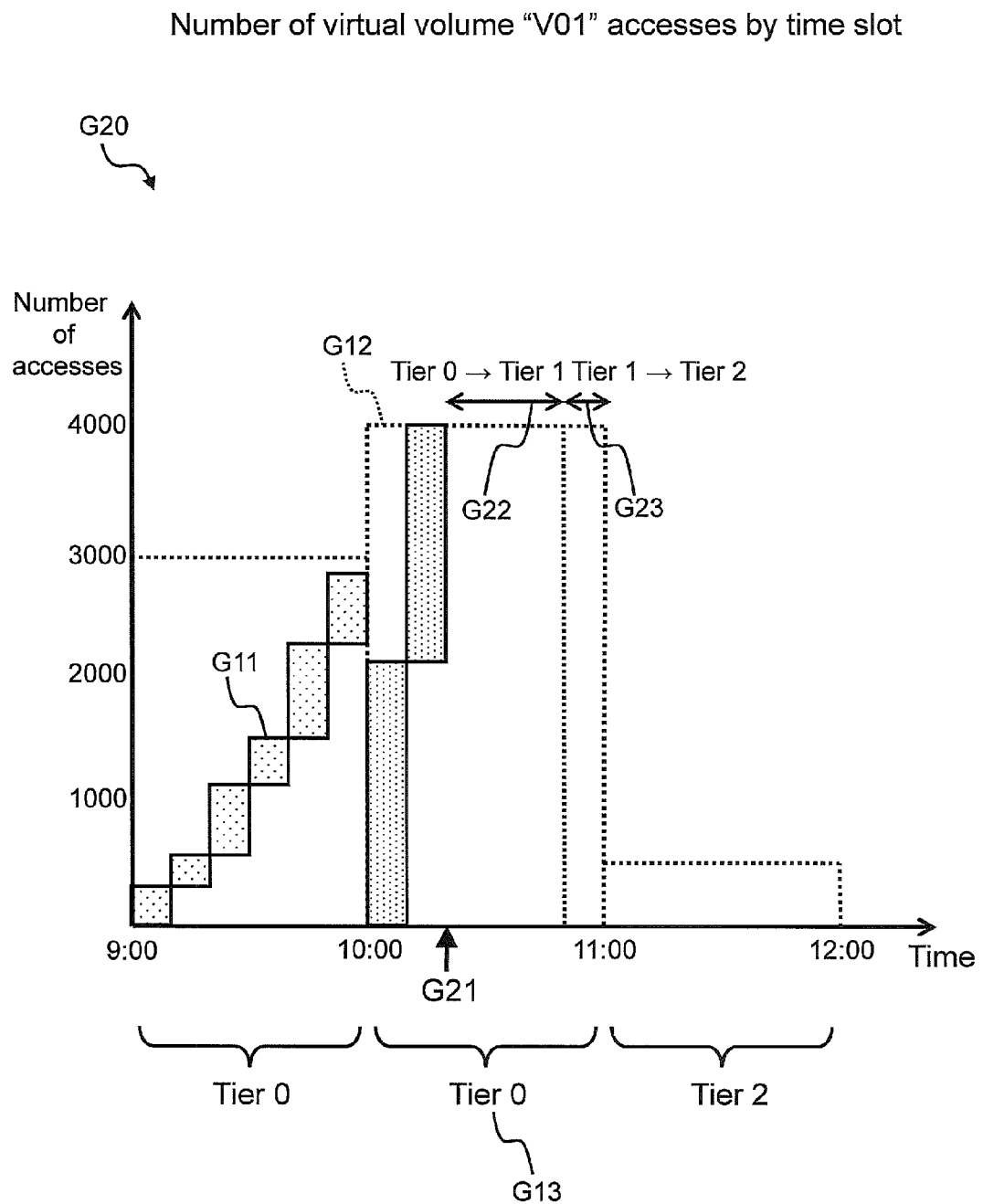
FIG. 19 shows another example of a chart of the number of accesses by time flag for virtual page 51 "V01".

FIG. 19 shows another example of a graph of the number of accesses by time slot for the virtual page 51 "V01".

In a case where it is supposed that the pool 60 to which the pool page 61 allocated to the virtual page 51 "V01" belongs is the pool 60 "P1" denoted in the preliminary reallocation threshold management table 210 of FIG. 18, the threshold time is "20 minutes". According to the graph G20 here, the number of accesses to the virtual page 51 "V01" at the current time G21 (10:20) has reached 4000. That is, the number of accesses has reached the number of accesses of the previous day within the threshold time (20 minutes). Therefore, the tier of the virtual page 51 is not suddenly changed from tier 0 to tier 2, but rather is first changed from tier 0 to tier 1 (G22), and thereafter changed from tier 1 to tier 2 (G23).

In accordance with this, a drastic drop in access performance can be avoided compared to when a change is suddenly made to tier 2 even in a case where another access is generated at 10:20 or later.

Figure 20:
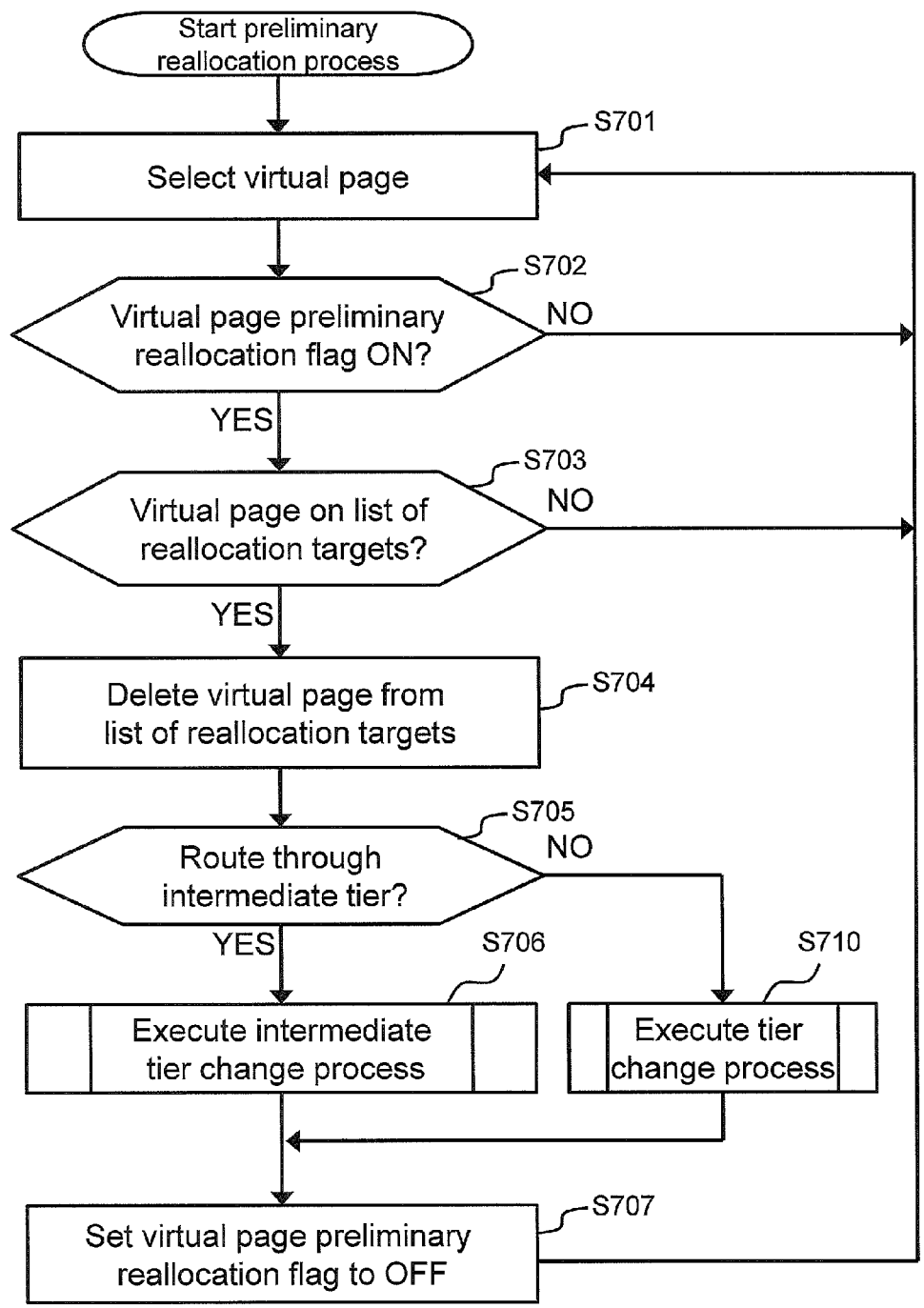
FIG. 20 shows another example of the flow of a preliminary reallocation process.

FIG. 20 shows an example of the flow of the preliminary reallocation process.

Since Steps S701 through S704 are the same as Steps S601 through S604 explained using FIG. 17 above, explanations will be omitted here. Step S705 and subsequent steps will be explained below.

The preliminary reallocation processing program 105 determines whether or not to go through an intermediate tier of the relevant virtual page 51 (S705). An intermediate tier determination process will be explained further below.

In a case where a determination to go through an intermediate tier was not made (S705: NO), the preliminary reallocation processing program 105 executes the tier change process shown in FIG. 16 (S710) and proceeds to Step S707.

In a case where the determination is to go through an intermediate tier (S705: YES), the preliminary reallocation processing program 105 executes a tier change process to an intermediate tier (S706) and proceeds to Step S707.

The preliminary reallocation processing program 105 turns "OFF" the preliminary reallocation flag of the virtual page 51 for which the reallocation was carried out (S707) and returns to Step S701.

Figure 21:
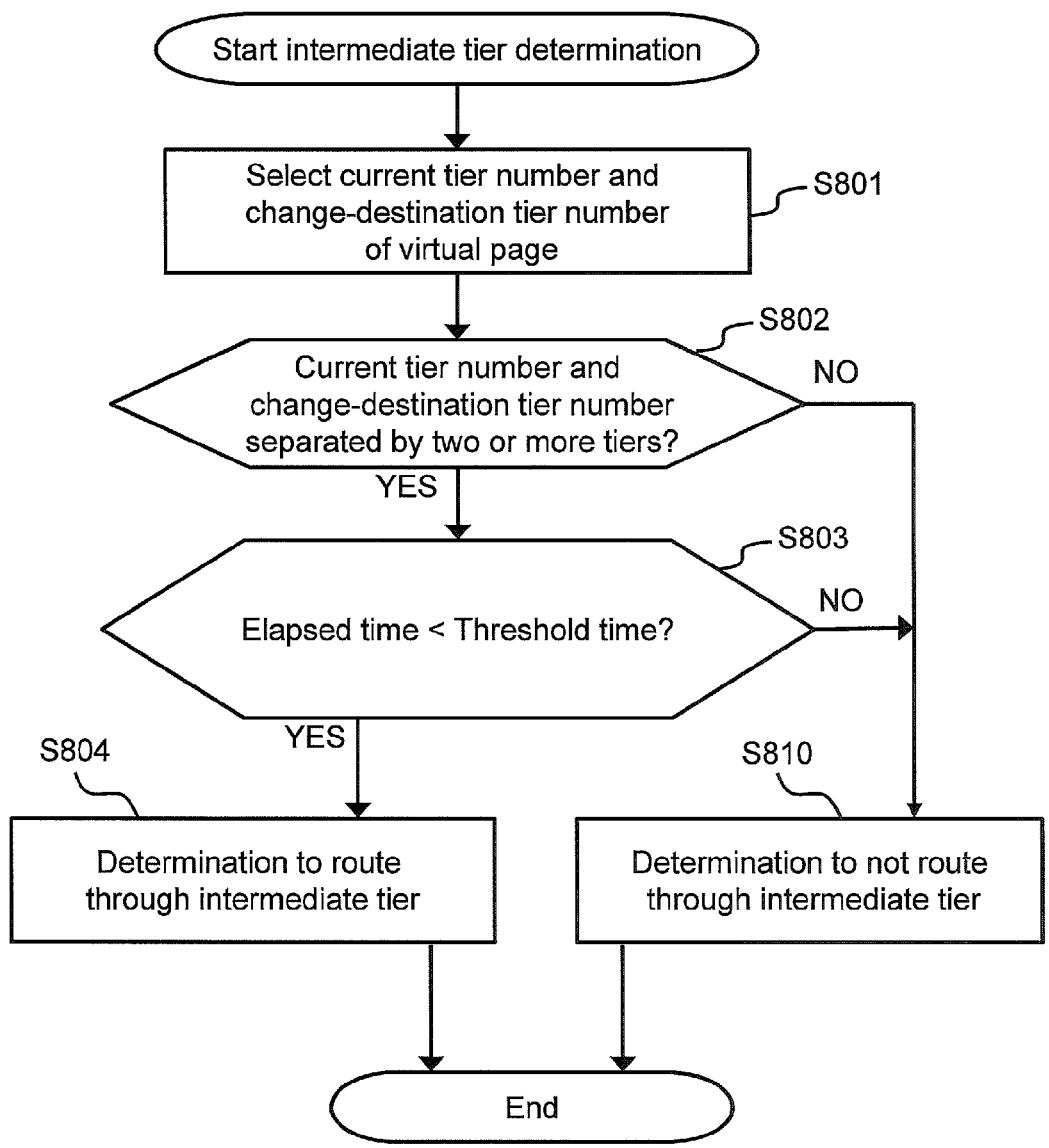
FIG. 21 shows an example of the flow of an intermediate tier determination process.

FIG. 21 shows an example of the flow of the intermediate tier determination process.

The preliminary reallocation processing program 105 selects the current tier number and the change-destination tier number of the virtual page 51 (S801).

The preliminary reallocation processing program 105 determines whether or not the current tier number and the change-destination tier number are separated by two or more tiers (S802). For example, tier 0 and tier 2 are separated by two tiers, and tier 0 and tier 1 are only separated by one tier.

In a case where the current tier number and the change-destination tier number are not separated by two or more tiers (S802: NO), the preliminary reallocation processing program 105 determines that it is not necessary to go through an intermediate tier (S810).

In a case where the current tier number and the change-destination tier number are separated by two or more tiers (S802: YES), the preliminary reallocation processing program 105 determines that it is necessary to go through an intermediate tier (S804).

According to the above processing, when the pre-change tier number and the change-destination tier number are separated by two or more tiers, it is possible to make a determination to lower (or raise) the tier number in stages by going through an intermediate tier.

Figure 22:
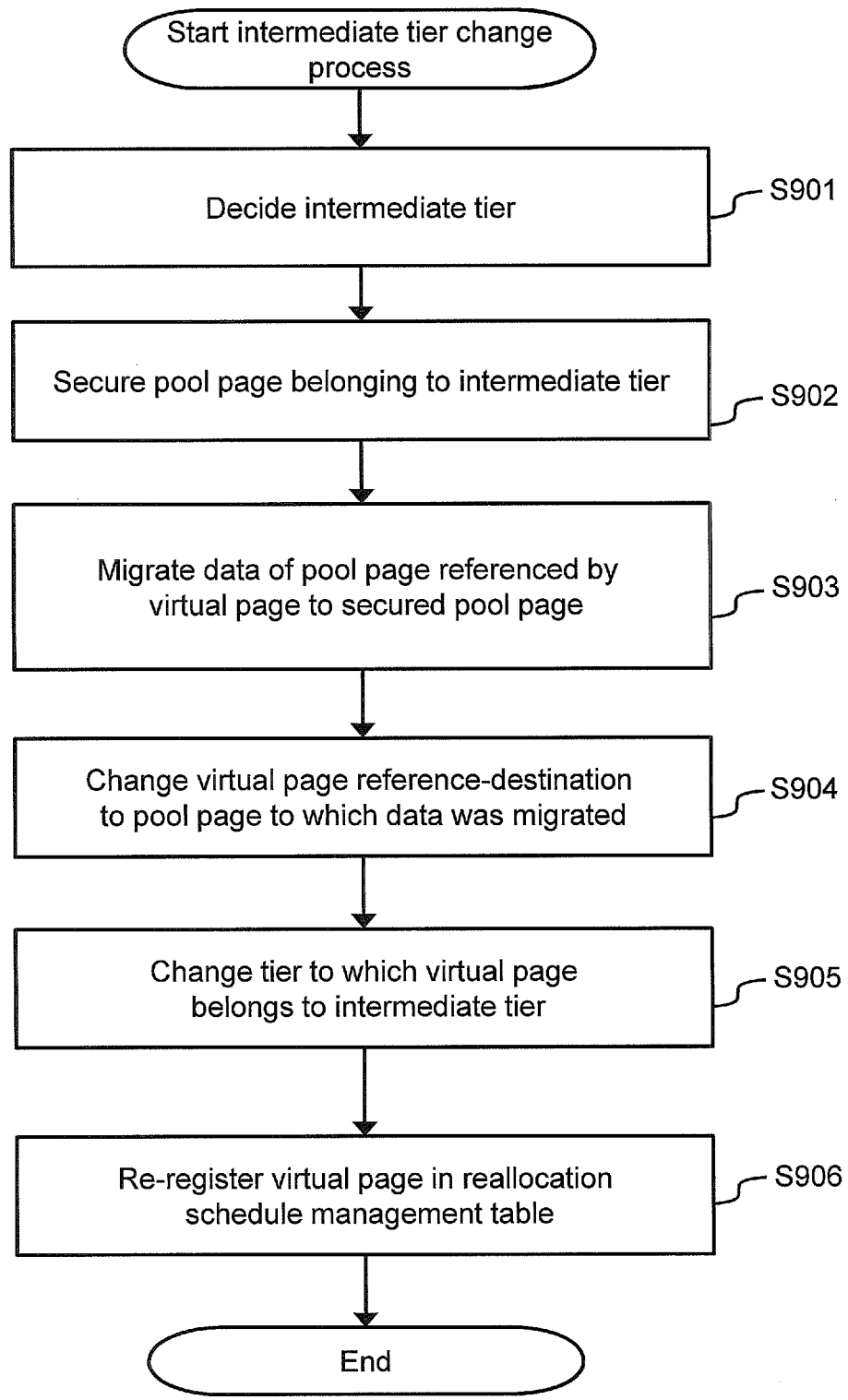
FIG. 22 shows an example of the flow of an intermediate tier change process.

FIG. 22 shows an example of the flow of the intermediate tier change process.

The preliminary reallocation processing program 105 decides an intermediate tier number that lies between the current tier number and the change-destination tier number (S901). The intermediate tier number, for example, may be a number exactly in-between the current tier number and the change-destination tier number. Or, in a case where the difference between the time that the number of accesses of the previous day was reached and the threshold time is large, the intermediate tier number, for example, may be a number that is closer to the current tier number, and in a case where this difference is small, may be a number that is closer to the change-destination tier number.

The preliminary reallocation processing program 105 reserves a data writable pool page 61 in the area corresponding to the intermediate tier of the pool 60 (S902).

The preliminary reallocation processing program 105 migrates the data of the pool page 61 that is allocated to the relevant virtual page 51 to the above-mentioned reserved pool page 61 (S903).

The preliminary reallocation processing program 105 changes the pool page 61 that is allocated to the relevant virtual page 51 to the pool page 61, which is the above-mentioned data migration destination (S904).

The preliminary reallocation processing program 105 changes the tier to which the relevant virtual page 51 belongs to the intermediate tier (S905).

The preliminary reallocation processing program 105 searches for the record in which the value of the change-source tier number→change-destination tier number in the reallocation schedule management table 207 is "intermediate tier number"→"change-destination tier number", and re-registers the relevant virtual page 51 in the list of reallocation targets of this record (S906).

In accordance with this, the relevant virtual page 51 is reallocated from the intermediate tier to the ideal tier when it is the start time of the reallocation process to be executed based on the reallocation schedule management table 207.

Example 3

The storage system 10 may receive a preliminary reallocation instruction with respect to a prescribed virtual page 51 from the host computer 21.

Figure 23:
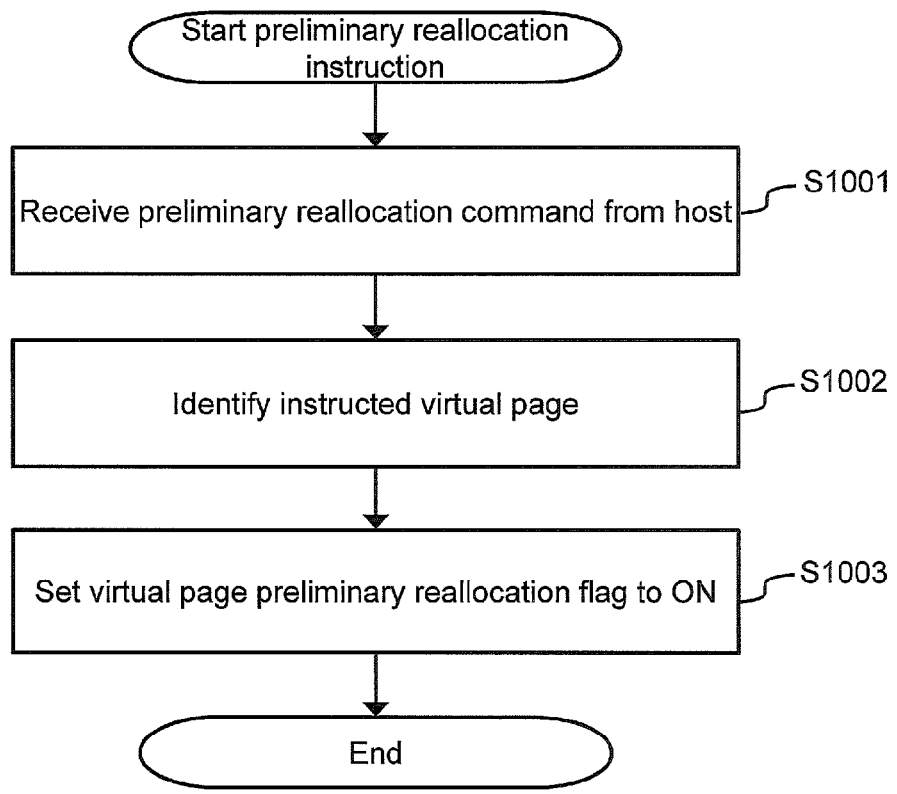
FIG. 23 shows an example of the flow of processing when a preliminary reallocation instruction is received from a host computer 21.

FIG. 23 shows an example of the flow of processing in a case where a preliminary reallocation instruction is received from the host computer 21.

The access control program 101 receives the preliminary reallocation command from the host computer 21 (S1001).

The access control program 101 analyzes this preliminary reallocation command and identifies the virtual page 51 that should undergo preliminary reallocation (S1002).

The access control program 101 turns "ON" the preliminary reallocation flag corresponding to the identified virtual page 51 in the virtual page management table 203 (S1003).

According to the above processing, the storage system 10 can preliminarily reallocate a virtual page 51 for which a preliminary reallocation has been instructed from the host computer 21. Furthermore, the storage system 10, for example, may receive a preliminary reallocation instruction for an entire virtual volume 50 instead of in units of virtual pages 51.

The several examples of the present invention described hereinabove are examples for explaining the present invention, and do not purport to limit the scope of the present invention to these examples. A person with ordinary skill in the art will be able to put this present invention into practice using various other modes without departing from the gist of the present invention.

For example, Example 3 may also be applied to Example 2 in addition to Example 1.

Also, for example, the control apparatus 41 may be a server apparatus that exists outside of the storage system 10, or may be an intelligent switch apparatus for relaying communications between the storage system 10 and the host computer 21.

Also, for example, the access control program 101 is not limited to the number of accesses per day (for example, the previous day) as a target for comparisons with the current number of accesses of the virtual page 51. For example, the current number of accesses may be compared to a number of accesses based on n number of the same time slots for each of n days (where n is an integer of 2 or more) (for example, an average, a maximum, a minimum, and so forth).

REFERENCE SIGNS LIST

104 Reallocation processing program
105 Preliminary reallocation processing program
203 Virtual page management table
204 Management table for number of virtual page accesses
206 Ideal tier management table
207 Reallocation schedule management table

The invention claimed is:

1. A storage system comprising:
a virtual volume, which is a virtual logical volume comprising multiple virtual areas;
a pool, which is a storage area comprising multiple actual area groups having different access performance; and
a controller, which stores a corresponding relationship between the virtual area and the actual area, configured to access the actual area corresponding to the virtual area based on accesses to the virtual area,
wherein the controller is configured to:
(X) decide, based on an access load trend with respect to each virtual area in each time slot, an ideal actual area allocation destination for the each virtual area in the each time slot; and
(Y) carry out a reallocation process for reallocating the virtual area to the ideal actual area starting at an actual reallocation start time, which is a time prior to a start time of the each time slot, so that the ideal actual area is allocated to the each virtual area by the start time of the each time slot, and
wherein, a preliminary reallocation start time is set to a current time, when a cumulative access load of a first virtual area during a time period from a start time of a first time slot to the current time becomes equal to or larger than a cumulative access load of the first virtual area during a time period of the entire first time slot at a past time, and the current time is a time within the first time slot, wherein a scheduled reallocation start time is a time that is scheduled to start the reallocation process such that the reallocation process can be completed by a start time of a next time slot of the first time slot, and wherein in the (Y):

(A) when the preliminary reallocation start time is earlier than the scheduled reallocation start time, the preliminary reallocation start time is the actual reallocation start time for starting the reallocation process; and (B) when the preliminary reallocation start time is either identical to or later than the scheduled reallocation start time, the scheduled reallocation start time is the actual reallocation start time for starting the reallocation process.

2. The storage system according to claim 1, wherein in the (Y), (C) in a case, which meets the condition (A), and in which a performance difference between a first actual area currently allocated to the virtual area and a second actual area allocated to the virtual area by the reallocation process is larger than a prescribed value, the controller is configured to reallocate the allocation of the virtual area from the currently allocated first actual area to a third actual area, which comprises performance that is in-between that of the first actual area and the second actual area, and thereafter, carry out reallocation from the third actual area to the second actual area.

3. The storage system according to claim 2, wherein, in the (C), the controller is configured to:

(D) start processing for the reallocation from the first actual area to the third actual area from the preliminary reallocation start time, and starts processing for the reallocation from the third actual area to the second actual area from the scheduled reallocation start time.

4. The storage system according to claim 3, wherein the controller is configured to execute the (D) in a case where a period of time from the start time of the first time slot to the preliminary reallocation start time is shorter than a prescribed threshold time.

5. The storage system according to claim 4, wherein the cumulative access load is the cumulative number of accesses, which increase either when data is written to the actual area, or when data is read from the actual area, and the controller is configured to carry out determination of the preliminary reallocation start time when the number of accesses increases.

6. The storage system according to claim 1, wherein the cumulative access load is the cumulative number of accesses, which increases either when data is written to the actual area, or when data is read from the actual area, and the controller is configured to carry out determination of the preliminary reallocation start time when the number of accesses increases.

7. A data reallocation method in a system for allocating an actual area from a pool, which is a storage area comprising multiple actual area groups having different access performance, to a virtual area in a virtual volume, which is a virtual logical volume comprising multiple virtual areas, the data reallocation method comprising the steps of:

(X) deciding, based on an access load trend with respect to each virtual area in each time slot, an ideal actual area allocation destination for the each virtual area in the each time slot; and (Y) carrying out a reallocation for reallocating the virtual area to the ideal actual area starting at an actual reallocation start time, which is a time prior to a start time of the each time slot, so that the ideal actual area is allocated to the each virtual area by the start time of the each time slot, and wherein, a preliminary reallocation start time is set to a current time, when a cumulative access load of a first virtual area during a time period from a start time of a first time slot to the current time becomes equal to or larger than a cumulative access load of the first virtual area during a time period of the entire first time slot at a past time, and the current time is a time within the first time slot, wherein a scheduled reallocation start time is a time that is scheduled to start the reallocation process such that the reallocation process can be completed by a start time of a next time slot of the first time slot, and wherein in the (Y):

(A) when the preliminary reallocation start time is earlier than the scheduled reallocation start time, the preliminary reallocation start time is the actual reallocation start time for starting the reallocation process; and (B) when the preliminary reallocation start time is either identical to or later than the scheduled reallocation start time, the scheduled reallocation start time is the actual reallocation start time for starting the reallocation process.

8. A control apparatus for providing a virtual volume, which is a virtual storage area comprising multiple virtual areas, the control apparatus comprising:

an interface device, which is coupled to multiple types of storage devices, which have different access performance, and which forms a basis for multiple actual area groups having different access performance;

a storage resource for storing management information, which comprises information denoting a corresponding relationship between the virtual area and the actual area; and a processor, which is coupled to the interface device and the storage resource, stores the corresponding relationship between the virtual area and the actual area, and configured to access the actual area corresponding to the virtual area based on accesses to the virtual area, wherein the processor is configured to:

(X) decide, based on an access load trend with respect to each virtual area in each time slot, an ideal actual area allocation destination for the each virtual area in the each time slot; and (Y) carry out a reallocation process for reallocating the virtual area to the ideal actual area starting at an actual reallocation start time, which is a time prior to a start time of the each time slot, so that the ideal actual area is allocated to each virtual area by the start time of the each time slot, and wherein, a preliminary reallocation start time is set to a current time, when a cumulative access load of a first virtual area during a time period from a start time of a first time slot to the current time becomes equal to or larger than a cumulative access load of the first virtual area during a time period of the entire first time slot at a past time, and the current time is a time within the first time slot, wherein a scheduled reallocation start time is a time that is scheduled to start the reallocation process such that the reallocation process can be completed by a start time of a next time slot of the first time slot, and wherein in the (Y):
(A) when the preliminary reallocation start time is earlier than the scheduled reallocation start time, the preliminary reallocation start time is the actual reallocation start time for starting the reallocation process; and
(B) when the preliminary reallocation start time is either identical to or later than the scheduled reallocation start time, the scheduled reallocation start time is the actual reallocation start time for starting the reallocation process.

* * * * *